(12) United States Patent
MacPherson et al.

(10) Patent No.: US 11,572,084 B2
(45) Date of Patent: Feb. 7, 2023

(54) INTEGRATED SYSTEMS FOR PASSENGER BUS

(71) Applicant: New Flyer Industries Canada ULC, Winnipeg (CA)

(72) Inventors: Robert Ian MacPherson, Jacksonville, AL (US); James Allan Heuchert, Oakbank (CA); John Kit, Winnipeg (CA); Tomasz Cychowski, Winnipeg (CA); Kirk Burcar, East St. Paul (CA); Farah Shah, Winnipeg (CA); Matthew Weselowski, Winnipeg (CA)

(73) Assignee: NEW FLYER INDUSTRIES CANADA ULC, Winnipeg (CA)

( * ) Notice: Subject to any disclaimer, the term of this patent is extended or adjusted under 35 U.S.C. 154(b) by 275 days.

(21) Appl. No.: 17/080,061

(22) Filed: Oct. 26, 2020

(65) Prior Publication Data
US 2021/0155264 A1    May 27, 2021

Related U.S. Application Data

(63) Continuation-in-part of application No. 16/040,922, filed on Jul. 20, 2018, now Pat. No. 10,835,428.
(Continued)

(51) Int. Cl.
*B60W 60/00* (2020.01)
*B60W 30/14* (2006.01)
(Continued)

(52) U.S. Cl.
CPC ........ *B60W 60/0025* (2020.02); *B60J 5/0497* (2013.01); *B60L 53/35* (2019.02); *B60P 1/43* (2013.01); *B60Q 1/24* (2013.01); *B60Q 5/005* (2013.01); *B60W 10/20* (2013.01); *B60W 10/22* (2013.01); *B60W 10/30* (2013.01); *B60W 30/143* (2013.01); *B60W 40/08* (2013.01); *B62D 31/02* (2013.01);
(Continued)

(58) Field of Classification Search
CPC .. B60W 60/0025; B60W 10/20; B60W 10/30; B60W 30/143; B60W 40/08; B60W 2420/42; B60W 2420/52; B60W 2520/10; G01C 21/3407
See application file for complete search history.

(56) References Cited

U.S. PATENT DOCUMENTS

| 5,391,041 A | 2/1995 | Stanbury et al. |
| 6,343,908 B1 | 2/2002 | Oudsten et al. |

(Continued)

OTHER PUBLICATIONS

Best Bus Sales, Titan II Low Floor Bus by Glaval—Accommodates Wheelchairs Without Lifts; Aug. 30, 2017; pp. 1-2.
(Continued)

*Primary Examiner* — Gertrude Arthur Jeanglaude
(74) *Attorney, Agent, or Firm* — Perry + Currier Inc.

(57) ABSTRACT

Improved passenger access and suspension systems for passenger buses, and controllers configured for use therewith; and passenger buses incorporating such systems and controllers. Integration of access ramp, door, suspension, charge interface, and other systems provides improvements (Continued)

in fully- or semi-automatic deployment of features such as passenger doors and ramps, and charge interface components, as well as navigation to passenger access points.

28 Claims, 10 Drawing Sheets

Related U.S. Application Data

(60) Provisional application No. 62/535,609, filed on Jul. 21, 2017.

(51) Int. Cl.
| | |
|---|---|
| *B60J 5/04* | (2006.01) |
| *B60W 40/08* | (2012.01) |
| *B60W 10/20* | (2006.01) |
| *B60W 10/22* | (2006.01) |
| *B60W 10/30* | (2006.01) |
| *G01C 21/34* | (2006.01) |
| *G08G 1/127* | (2006.01) |
| *B60Q 1/24* | (2006.01) |
| *B60Q 5/00* | (2006.01) |
| *B60P 1/43* | (2006.01) |
| *B60L 53/35* | (2019.01) |
| *B62D 31/02* | (2006.01) |

(52) U.S. Cl.
CPC ......... *G01C 21/3407* (2013.01); *G08G 1/127* (2013.01); *B60W 2420/42* (2013.01); *B60W 2420/52* (2013.01); *B60W 2520/10* (2013.01); *B60W 2555/00* (2020.02)

(56) References Cited

U.S. PATENT DOCUMENTS

| 6,825,628 | B2 | 11/2004 | Heigl et al. |
| 8,800,087 | B2 | 8/2014 | Couto et al. |
| 2001/0005478 | A1 | 6/2001 | Lewis et al. |
| 2003/0044266 | A1 | 3/2003 | Vandillen et al. |
| 2006/0233632 | A1 | 10/2006 | Hayes et al. |
| 2007/0059140 | A1 | 3/2007 | Kiser |
| 2007/0182528 | A1* | 8/2007 | Breed ................ B60W 30/16 |
| | | | 348/148 |
| 2008/0184500 | A1 | 8/2008 | Bettcher |
| 2011/0035104 | A1 | 2/2011 | Smith |
| 2012/0161469 | A1 | 6/2012 | Kerr et al. |
| 2016/0280262 | A1* | 9/2016 | Oyama ................ G05D 1/02 |
| 2017/0057519 | A1 | 3/2017 | Ungetheim et al. |
| 2017/0136842 | A1 | 5/2017 | Anderson et al. |
| 2017/0282774 | A1 | 10/2017 | Schepmann |

OTHER PUBLICATIONS

Braunability, Commercial Wheelchair Lifts for Transit Buses and Motorcoaches; Aug. 23, 2017; pp. 1-2.
Championbus.com, Intellisync Electronically Controlled "Smart" Suspension, p. 1 [date unknown].
Championbus.com, Equalizer Ramp; Equalizer Ramp Single Slope; Mar. 2015, p. 1.
Optima Bus Corp., The Ultimate in Transit Products; Suspension and Axles Opus Low Floor Bus; Jan. 3, 2005; pp. 1-27.
Optima Bus Corp., The Ultimate in Transit Products; Wheelchair Ramp System Opus Low Floor Bus; Jan. 6, 2005; pp. 1-34.

* cited by examiner

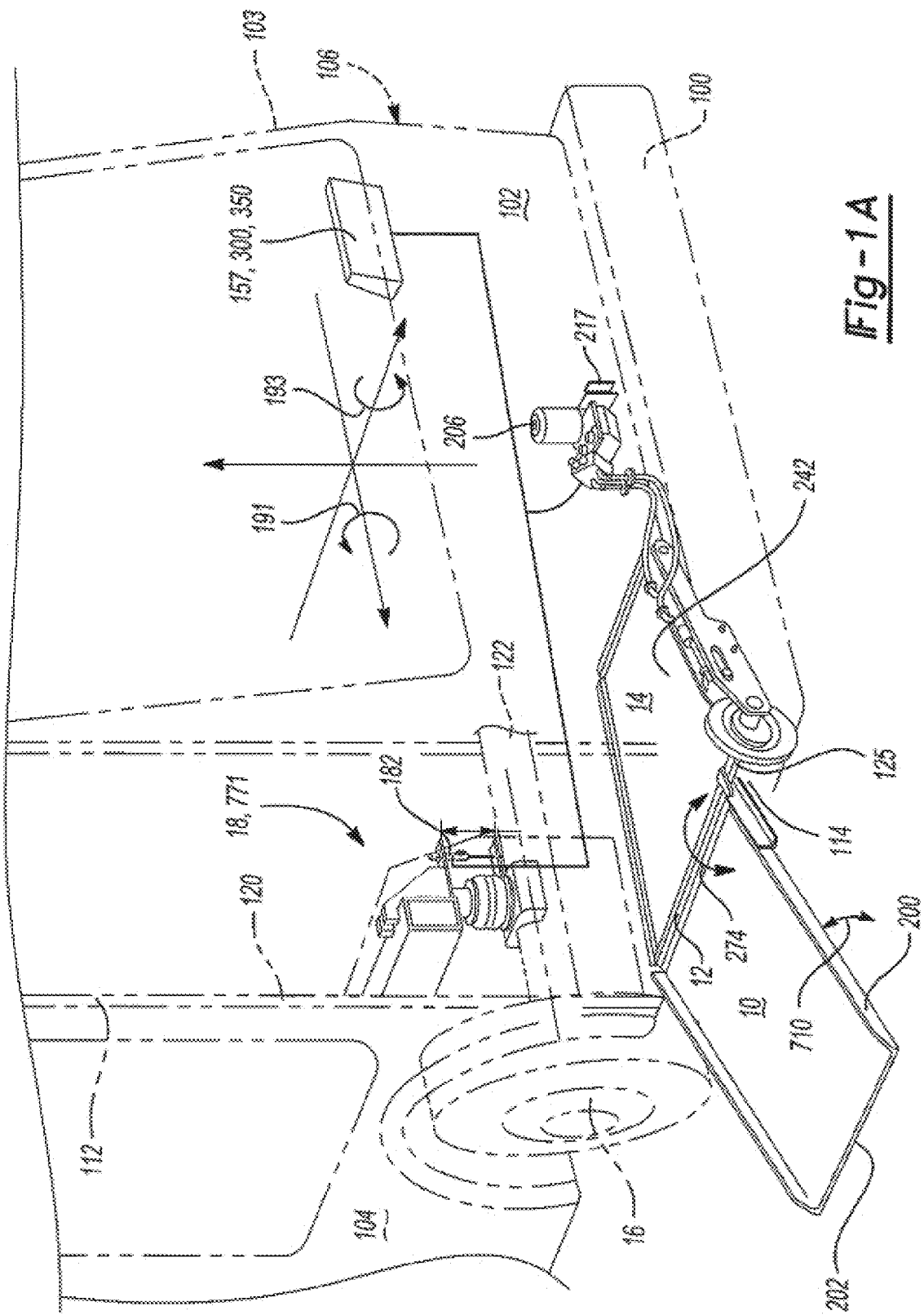

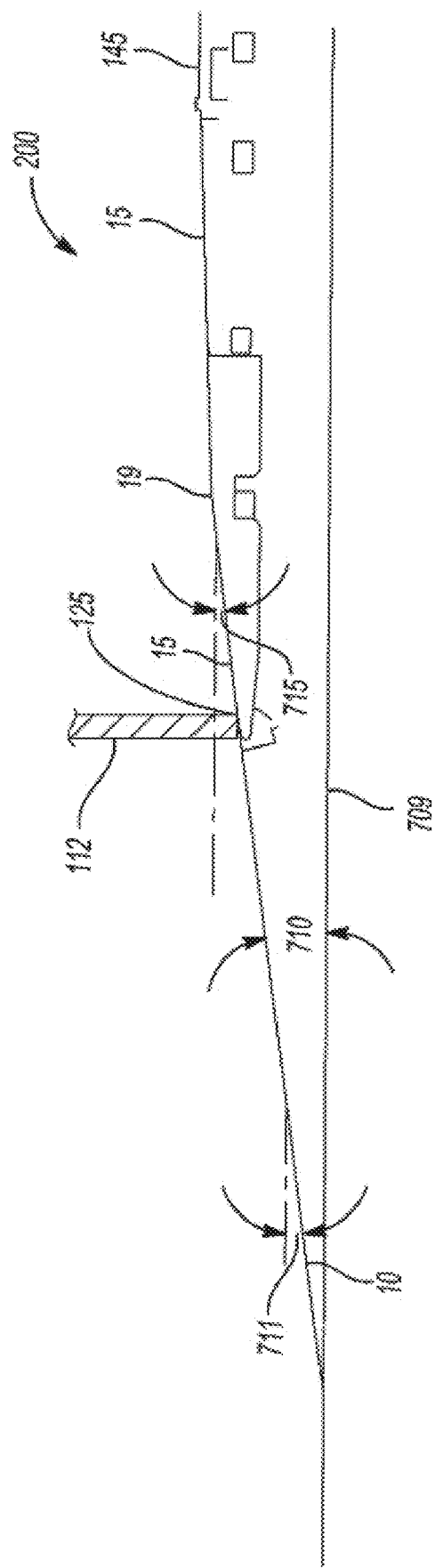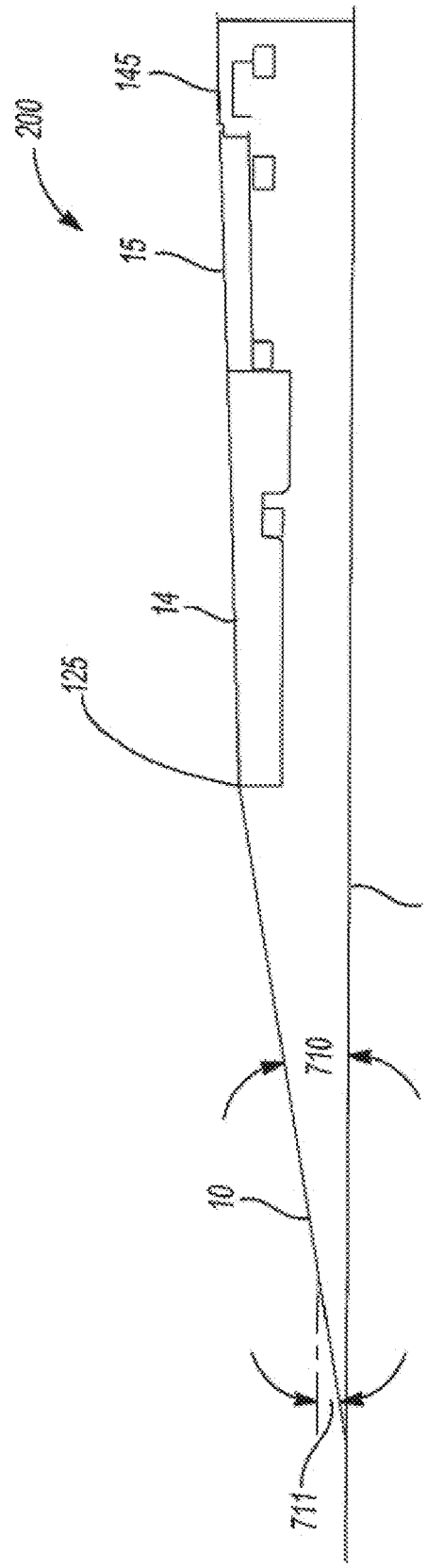

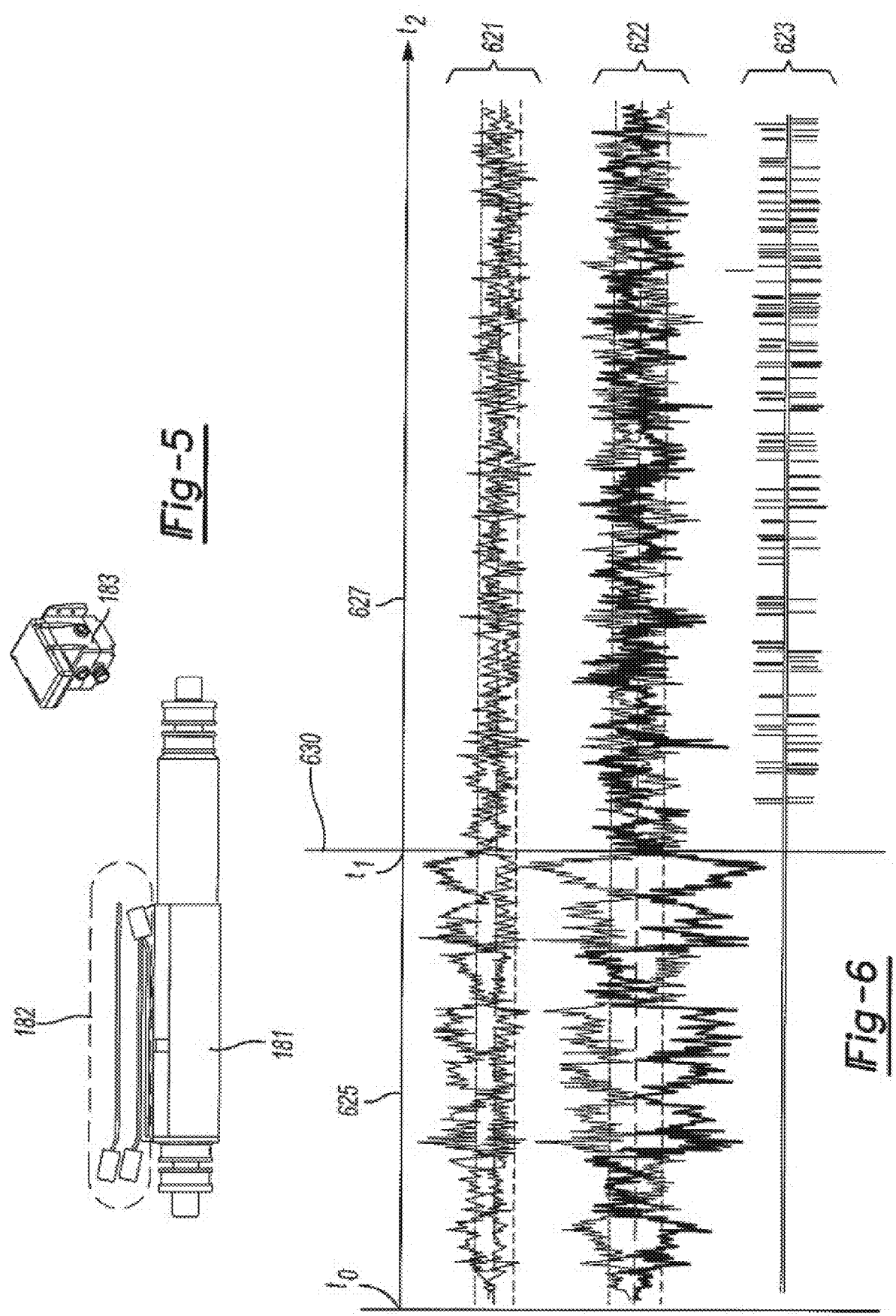

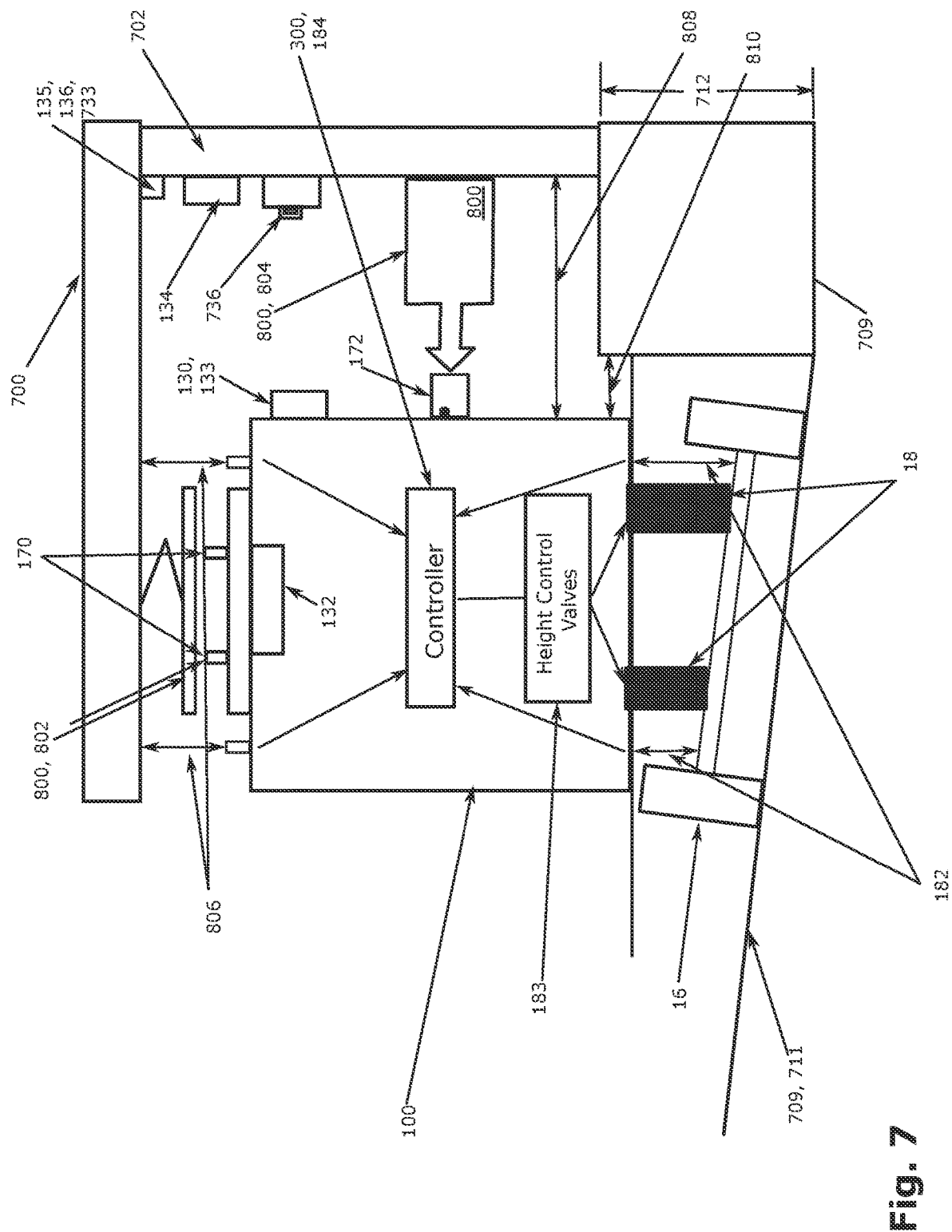

INTEGRATED SYSTEMS FOR PASSENGER BUS

CROSS-REFERENCE TO RELATED APPLICATIONS

This application claims all benefit, including priority, of U.S. Provisional Patent Application Ser. No. 62/535,609, filed 21 Jul. 2017 and entitled Integrated Systems for Passenger Bus; and of U.S. patent application Ser. No. 16/040,922, filed 20 Jul. 2018 and entitled Integrated Systems for Passenger Bus; the entire contents of each of which are incorporated herein by this reference.

FIELD OF THE INVENTION

The present disclosure relates to improvements in passenger buses. In particular, the disclosure relates to improvements in suspension, access ramp, door, annunciation, and other systems for passenger buses, and to integration of such systems with each other and with other bus systems in order to improve passenger accessibility, passenger ride comfort, safety, and operating efficiency.

BACKGROUND OF THE INVENTION

Suspension systems, passenger access ramps, and other components and systems for buses are known. Examples of passenger access ramps, for example, are disclosed in commonly-owned U.S. Pat. Nos. 5,391,041 and 6,343,908.

However, concerns persist with respect to passenger accessibility and ride quality, and other aspects of passenger comfort and safety. The disclosure herein enables improvements in each of these aspects, and in combinations thereof, through physical and logical integrations which provide previously unknown operational options as well as increased efficiency.

SUMMARY OF THE INVENTION

In various aspects and embodiments, the present disclosure provides improved passenger access, safety, and informational systems; suspension systems; and controllers configured for use therewith, for passenger buses, and passenger buses incorporating such systems and controllers.

For example, in various aspects and embodiments the invention provides buses and fully- and/or semi-automated passenger access devices, such as ramps, doors, lights, and annunciators, and improvements therein, along with extensible suspension units and automatic or semi-automatic navigational systems and controllers, in order to promptly, efficiently, and safely open, extend, or otherwise deploy doors, ramps, vehicle charging apparatus, etc., and safely embark or debark passengers. Such systems can be operated in multiple modes of operation.

In accordance with some aspects and embodiments, for example, the invention provides buses and control modules for buses. Such a bus can comprise a body supported by a frame and housing a plurality of passenger seats; at least one passenger access door configured to enable passenger access through at least one side of the body; and a plurality of vehicle exterior condition sensors, the plurality of vehicle exterior condition sensors comprising: at least one passenger presence detector; at least one vehicle navigation sensor; at least one steering controller; at least one speed controller; at least one extensible suspension controller; and at least one passenger access door controller. A corresponding control module can comprise at least one controller configured to receive from the at least one vehicle navigation sensor signals indicating at least a position and orientation of the passenger bus, and a speed at which the passenger bus is moving; receive from the at least one passenger presence detector signals indicating the presence of a passenger; generate, based at least on the signals indicating a position, orientation, and speed of the passenger bus, signals adapted for causing some or all of the steering controller and the speed controller to navigate the passenger bus to a desired location relative to a passenger loading facility and place the passenger bus in a stopped passenger loading condition; route the signals for navigating the passenger bus to some or all of the speed controller and the steering controller; and when the bus is in a stopped passenger loading condition, route to the at least one passenger access door controller signals adapted to cause the passenger access door controller to open the passenger access door.

In various further aspects and embodiments, such buses and controllers can be configured to automatically and/or semi-automatically deploy charging interfaces, for charging of batteries and other energy storage systems, and to automatically level and/or otherwise orient the buses in a condition suitable for charging at a charging station.

It will be appreciated by those skilled in the relevant arts that the various aspects and embodiments of the invention, and combinations thereof, are suitable for implementation in any of a very wide variety of passenger buses, including buses adapted for route-based transit operations, motor coaches, shuttles, and passenger vans.

These and other improvements and advantages are explained further in the disclosure below.

fs

BRIEF DESCRIPTION OF THE DRAWINGS

Various aspects and embodiments of the invention are illustrated in the accompanying drawings, which are meant to be exemplary and not limiting, and in which like references are intended to refer to like or corresponding parts.

FIG. 1A is a schematic diagram showing a perspective view of a general arrangement of components of an integrated system comprising an accessibility ramp and a suspension system of a passenger bus in accordance with aspects and embodiments of the invention.

FIGS. 4A and 4B are schematic side views showing aspects of an embodiment of a deployable passenger access ramp in accordance with the invention.

FIG. 5 provides schematic side and perspective views of embodiments of components of an extensible suspension unit in accordance with aspects and embodiments of the invention.

FIG. 6 is a schematic view showing a chart of representative ride response of a passenger bus incorporating a suspension system in accordance with aspects and embodiments of the invention, while in operation.

FIG. 7 is a schematic diagram showing a perspective view of components of an extensible suspension unit in accordance with aspects and embodiments of the invention.

DESCRIPTION OF EMBODIMENTS

Figure 1B:
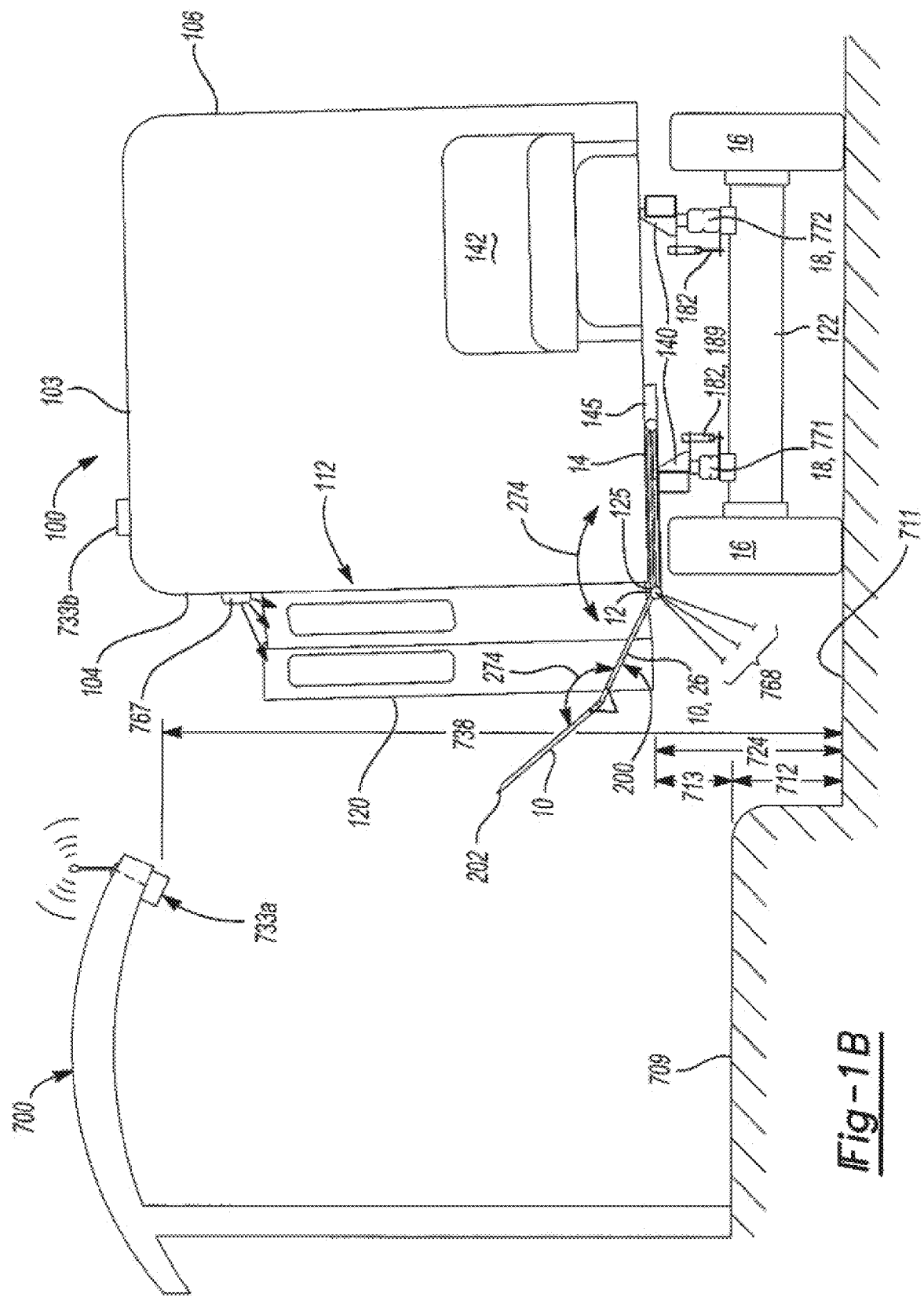
FIG. 1B is a schematic diagram showing a cross section of a bus, a passenger loading facility, and components of an integrated system comprising accessibility ramp and a suspension system of a passenger bus in accordance with aspects and embodiments of the invention.

In various aspects and embodiments, the present disclosure provides improved passenger access and suspension systems for passenger buses, and controllers configured for use with such systems; and passenger buses incorporating such systems and controllers.

For example, in various aspects and embodiments the invention provides fully- and/or semi-automated passenger access ramps, doors, interior and exterior lights and/or annunciators, and/or other passenger access components, and improvements therein. In various embodiments passenger ramps in accordance with the invention can be operated in multiple modes of operation. In a first mode, for example, some embodiments of ramps in accordance with the invention may be deployed so as to enforce maximum or minimum panel slope or grade requirements. In further modes, constant slopes may be established and maintained between all or some subset of ramp panels. In some embodiments, deployment of ramps, once activated, can proceed automatically in accordance with such modes. At the same or other times, in the same or other embodiments, passenger access doors, lights, annunciators, and other components can be activated to open, close, turn on, turn off, and offer various announcements, etc.

In further aspects and embodiments the invention provides controllably contractable and/or extendible (hereinafter "extensible") suspension systems for passenger buses, and improvements therein. Systems incorporating such suspensions and suitably-configured controllers can be used alone or in combination with access ramps of the various types disclosed herein. For example, such units can be used to lower one side of a bus, such as a curb or passenger door side, in order to facilitate passenger entry; to raise an opposite side of a bus, for example to minimize a slope of a passenger access ramp, or to maintain a constant slope over all or selected portions of a ramp; and/or they can be used to dampen bus body roll and to otherwise improve passenger ride comfort, as discussed herein.

In accordance with various aspects and embodiments, the invention further provides semi- and/or fully automatically controllable systems and components such as vehicle recharging alignment sensors 440, controllers 300, 312, and actuators 455; steering condition sensors, controllers 300, 308, and actuators 453; speed (and/or acceleration) sensors 211, controllers 300, 314, and actuators 452; traction sensors 211, controllers 300, 314, and braking systems 451 (which can for example including any or all of disk and drum brakes, electrical inverters or generators, etc.), etc.

FIG. 1 is a schematic perspective view showing a general arrangement of an embodiment of an accessibility ramp 200, door 120 and partial wheel/axle suspension system 16, 18, 122 of a passenger bus 100.

In embodiments such as those shown in FIGS. 1A and 1B, a bus 100 includes a body 103, typically housing a plurality of passenger seats 142 and a driver's seat (not shown), a front end 102 and two sides 104, 106, including curb (or "door") side 104 and street (or "opposite") side 106, which may of course be relative designations, based on bus configuration and usage. In normal operation, a curb side 104 is placed close to a curb platform, or other passenger loading point 709 in order to embark and disembark passengers safely, with minimal risk of their tripping on stairs, being struck by automobiles or other traffic, etc. Depending upon local traffic regulations, bus configuration, and operating preferences, curb side 104 can be on the right-hand side or left-hand side of the bus, or both. A curb side 104 includes one or more passenger entrances 112, each entrance 112 comprising one or more passenger doors 120 configured to open such that a folded or otherwise deployable ramp 200, which is typically installed so as to fold into a well 242 provided at an interior floor 145 (FIG. 1B) of the bus 100, can be deployed by, for example, outward rotation of one or more exterior ramp panels 10 until a distal edge 202 of the ramp 200 contacts the curb, ground, sidewalk, passenger area, or other passenger-loading surface 709 (FIG. 1B) outside the bus. In some embodiments of ramps 200, interior ramp panel(s) 14 are stationary; in other embodiments distal edge 12 of an interior ramp panel 14 can rotate downward, as shown and as described herein, to minimize a slope 711 (see FIGS. 4A and 4B) of the ramp for any given rise 724 between a terrestrial surface 709, 711 contacted by distal edge 202 of outer ramp panel 10 and sill 125 of entrance 112 or interior floor 145 of the bus 100.

It will be appreciated by those skilled in the relevant arts that the invention(s) disclosed herein are compatible with a very wide variety of types of passenger buses 100, including articulated or other large transit buses, highway coaches, shuttles, and special buses adapted for transportation of wheel-chair bound or other passengers faced with mobility challenges.

Buses of the type(s) contemplated herein typically comprise pluralities of axles 122, each axle supported by two or more wheels 16, by means of a suspension system 18 that may also cooperate with a chassis or frame 140 (FIGS. 1B, 2B) of the bus 100 to provide flexible support for the bus and preferably damped absorption of shocks and vibrations encountered by the bus during operation, for example shocks induced by contact of wheels 16 with irregularities in roads or other surfaces.

In various aspects and embodiments, suspension units 18 in accordance with the invention are extensible, so that either one unit, proximate a passenger access ramp 200, and/or one or more adjacent units (e.g., another door-side unit or a unit on an opposite side of the same axle) can be contracted, so as to lower a sill or threshold 125 of passenger access door 112, and thereby decrease a slope or grade of one or more ramp panels 10, 14 as described herein—i.e., to cause the bus to 'kneel' in order to facilitate passenger ingress and egress. For example, a driver or other operator (not shown) of a bus 100 can activate one or more switches or other controls on a control panel of the bus to initiate fully- or partially-automated deployment of a ramp 200, in conjunction with contraction with one or more suspension units, to both minimize and control grades or slopes of one or more ramp panels 10, 14 as described herein. Extensible suspension units 18 in accordance with such aspects of the invention can be configured to enable fully or semi-automated electronic control of the suspension heights of any and/or all 25 wheels, independently or in desired combination(s).

Alternatively, one or more suspension units 18, such as one or more units on a side of the bus opposite the passenger access door, can be extended so as to minimize a difference between a slope of one or more of the ramp panels and an interior floor surface 145 (FIGS. 4A and 48) of the bus.

As will be appreciated by those skilled in the relevant arts, once they have been made familiar with this disclosure, extensible suspension units 18 suitable for use in implementing the various aspects and embodiments of the invention may be of any type suitable for use in accomplishing the purposes disclosed or suggested herein. For example, a wide variety of pneumatic suspension units (such as those shown in FIGS. 18 and 28) and/or hydraulic units (such as those shown in FIGS. 1A, 2A, and 5) are now commercially available. Doubtless other suitable types will become available in future.

Among the advantages offered by various aspects and embodiments of the invention is integration of access ramp operation with suspension "kneeling" operations, by means of various combinations of electronic, pneumatic, hydraulic, and/or other types of mechanical devices and controllers 300, including suitably-configured switches, sensors and signal processors configured to generate automatic control commands for various components of the system, in accordance with instructions provided by a bus operator. Use of such sensors, switches, and signal processor(s) can, for example, enable monitoring and control of ramp operations such as deployment angles {slope or grade) 711 (FIG. 4A, 48); and at certain points, can suspend operation of the ramp and commence kneeling operations until the same or other sensors indicate that the ramp has touched the ground or other surface 709 outside the bus. This can, for example, ensure that a desired or otherwise designated ramp angle (slope) 711 is not exceeded, while minimizing the kneeling depth of the bus suspension, thereby minimizing associated delays in bus service.

Through the use of appropriately-configured sensors, switches, and signal processors, various embodiments of the invention can also relieve a driver or other operator of the bus from the burden of determining whether initiation of kneeling processes for the bus, prior to ramp operation, is or is not required, in order to avoid exceeding a desired or otherwise deviating from a designated ramp angle (slope)—instead, the driver can simply initiate the ramp deployment process, and allow the system to automatically determine whether any kneeling, or further kneeling, by the suspension is required based on feedback from the system sensors.

Similarly, drivers and other operators of buses 100 can be relieved of some or all of the burden of determining when, where, and/or in what manner to accomplish other passenger access and vehicle operation functions, such as opening positioning the vehicle 100 relative to a loading platform 709, opening and/or closing doors 120, turning on or extinguishing interior and/or exterior lighting, making passenger announcements, and/or activating vehicle charging interfaces 455.

As previously noted, many vehicle components, including for example access ramp controllers 300, in accordance with the invention can be operated in a variety of modes.

For example, in a first mode, an access ramp can be deployed in such manner as to ensure that a slope 711 of the ramp is minimized, or a maximum designated slope 711 is not exceeded. For example, regulations under the Americans with Disabilities Act (ADA) currently require that access ramp slopes 711 not exceed one (1) unit of rise to six (6) units of run (1:6 slope, approximately 9.5 degrees from level). Through the use of Hall-effect and other angle- or position-sensitive devices 208 (FIG. 2D), the invention enables entire access ramps 200, or one or more individual panels 10, 14, 26 etc., thereof, to be deployed at slopes 710 not exceeding such maximum values, either by causing the ramp panel(s) 10, 14, etc., to be suitably deployed relative to one another (for example, some ramps at angles exceeding specified slopes and others at lesser slopes), and/or by causing suspension units 18 associated with one or more wheels 16 of the bus to be contracted, and/or extended, so that the bus kneels until a desired slope 710 has been established.

For example, in a first mode, an access ramp 200 can be deployed in such manner as to ensure that a slope 711 of the ramp is minimized, or a maximum designated slope 711 is not exceeded. For example, regulations under the Americans with Disabilities Act (ADA) currently require that access ramp slopes 711 not exceed one (1) unit of rise to six (6) units of run (1:6 slope, approximately 9.5 degrees from level). Through the use of Hall-effect and other angle- or position-sensitive devices 208 (FIG. 2D), the invention enables entire access ramps 200, or one or more individual panels 10, 14, 26 etc., thereof, to be deployed at slopes 710 not exceeding such maximum values, either by causing the ramp panel(s) 10, 14, etc., to be suitably deployed relative to one another (for example, some ramps at angles exceeding specified slopes and others at lesser slopes), and/or by causing suspension units associated with one or more wheels of the bus to be contracted, and/or extended, so that the bus kneels until a desired slope 710 has been established.

As a further example, in a second mode of operation, sensor(s) 208 can be used to drive slopes of each of a plurality of ramp panels 10, 14, 26, etc., with respect to the ground, each other, and/or the bus chassis to a constant rise/run ratio, for example to a slope consistent with a panel or region 14, 15 of the bus floor near the access door 112, so as to reduce or eliminate a break-over angle 19 (FIG. 4A) at a hinge or other connection between an ramp platform 10 and ramp or floor panel 14 inside the bus. For example, one or more angles 715 between surfaces 10, 14, 15 (FIG. 4) can be driven as close as possible to zero, or within another desired tolerance (e.g., approximately 2 degrees, ramp platform matching entrance floor slope), making a longer, constant-slope entrance path from curb height 709 to a main bus aisle way, e.g. an aisle in the center of the passenger compartment. Again, such mode(s) can be implemented through the use of suitably-adapted panel angle sensors, contraction and/or extension of one or more suspension unit(s) 18, etc.

In further examples, charging components 455 can be deployed to engage overhead charging apparatus 800, such as a pantograph 802 to engage rooftop charge rails 170, and or side-actuated charging apparatus 804 and interface (e.g., plug receptacle) 172.

Among other advantages offered by various embodiments of the invention is the ability to establish desired ramp configurations with minimum delays. For example, by allowing a controller to automatically determine whether use of extensible suspension units 18 to kneel a curb side 104 of the bus 100, or to raise an street side 106, is desirable in order to establish a desired ramp configuration, the invention can eliminate the use of the extensible suspension system in at least some circumstances, and thereby eliminate loss of time in waiting for the suspension to complete the kneeling/extension operation(s). This can minimize, for example, adverse impacts on time routes, etc.

Figure 2A:
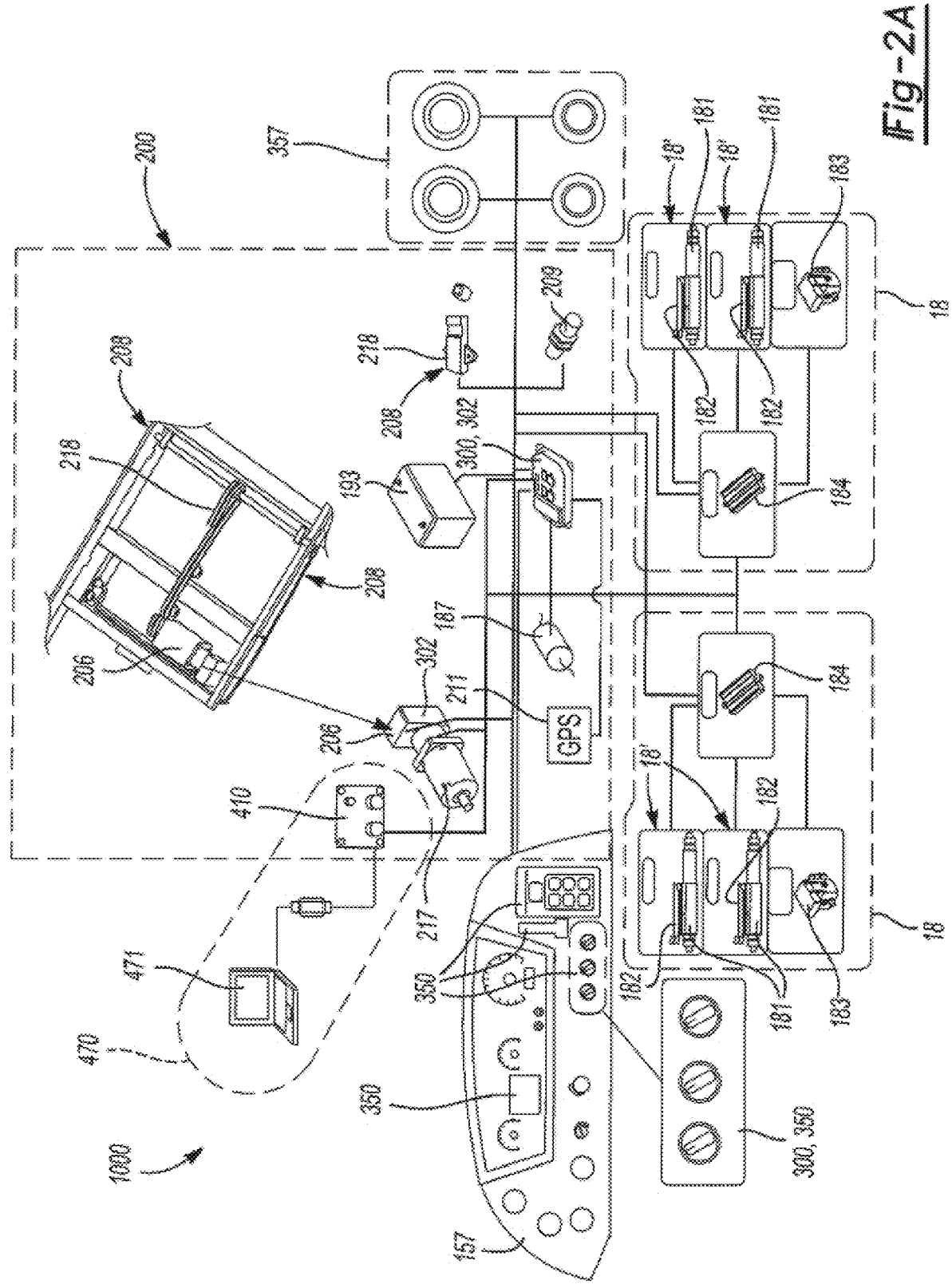
FIG. 2A is a schematic diagram showing integrated bus system components in accordance with aspects and embodiments of the invention.
Figure 2B:
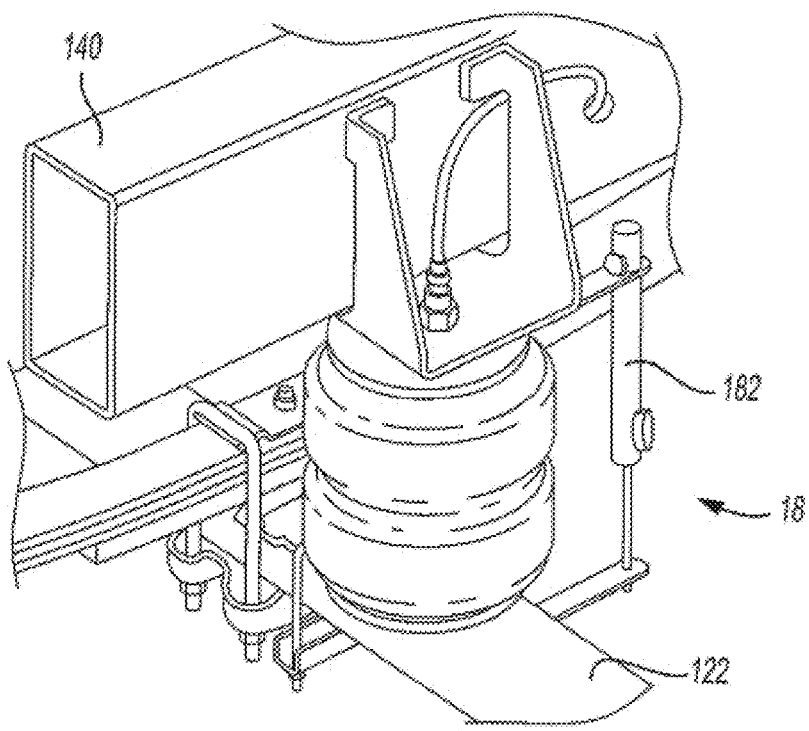
FIG. 2B is a schematic diagram showing a perspective view of components of an extensible suspension unit in accordance with aspects and embodiments of the invention.
Figure 3A:
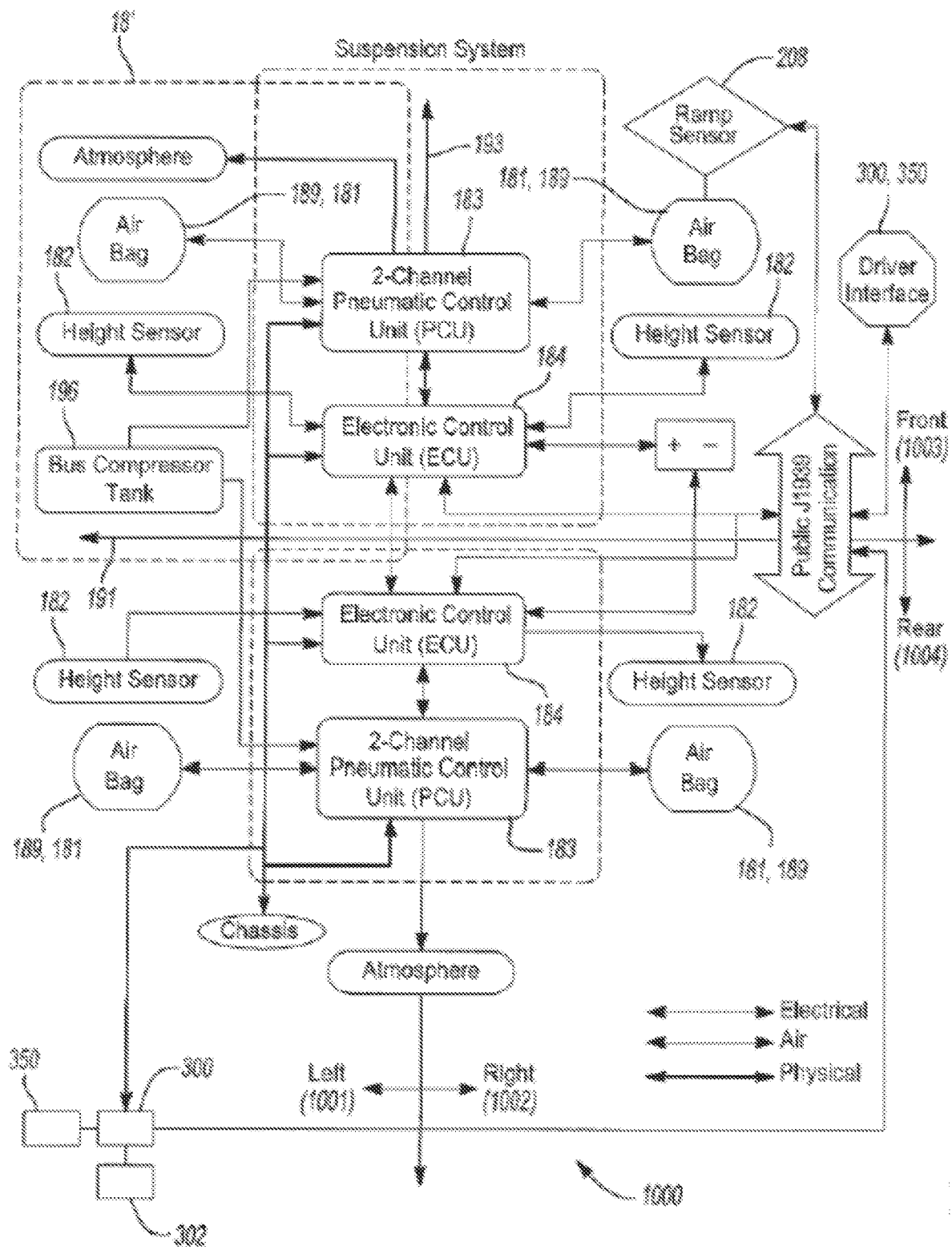
FIGS. 3A and 3B are schematic diagrams showing embodiments of integrated bus systems in accordance with various aspects of the invention.
Figure 3B:
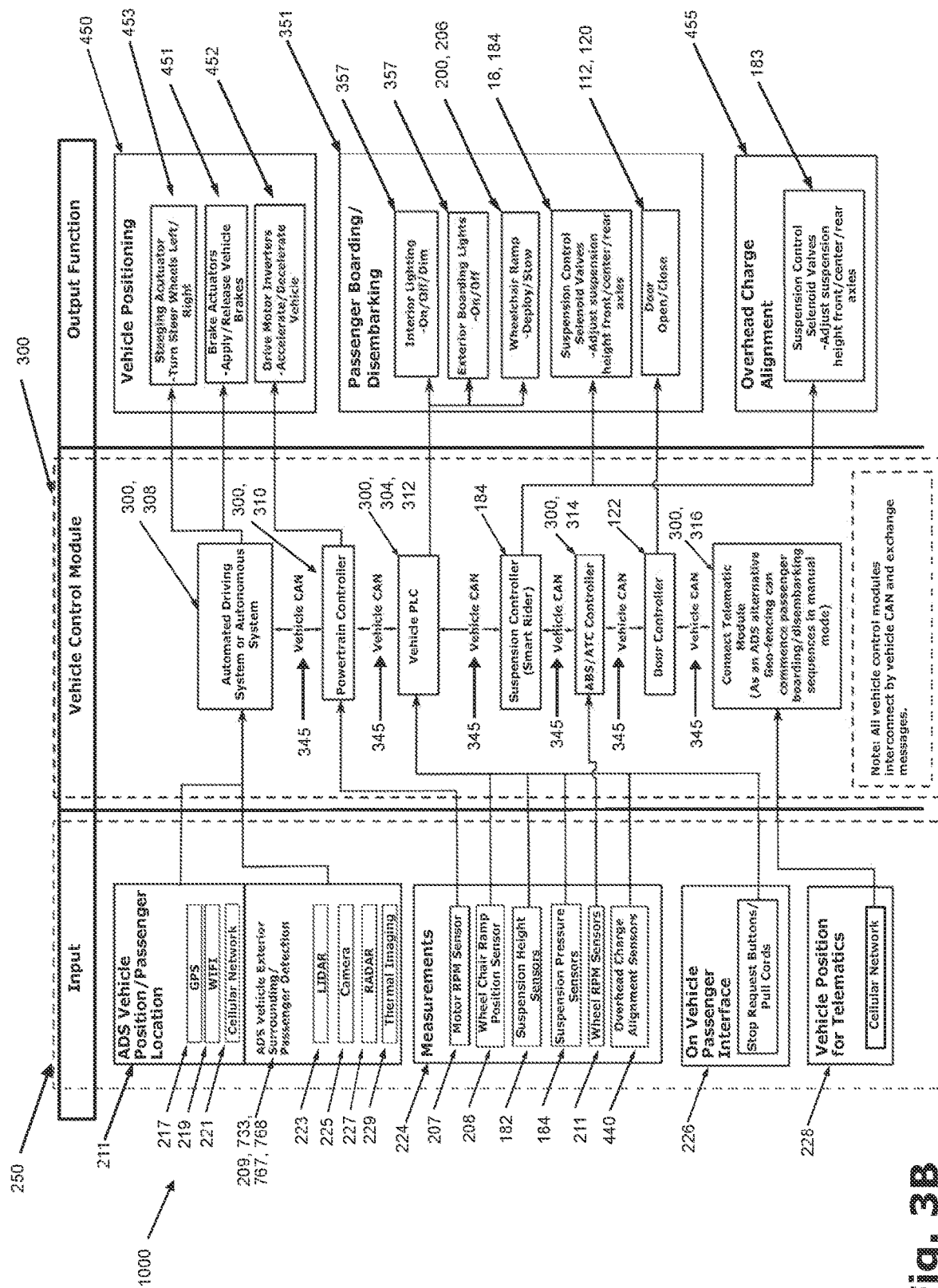

FIGS. 2A, 3A, and 3B are schematic block diagrams of embodiments of integrated bus systems 1000, and components thereof, in accordance with various aspects and embodiments of the invention. As shown for example in FIGS. 2A and 2B, a system 1000 can comprise, in addition to one or more passenger doors or entrances 112, 120 (shown in FIGS. 1A, 1B), one or more deployable passenger access ramps 200 configured to facilitate passenger access from a passenger loading surface to the curbside passenger door 112, 120; a plurality of pneumatic, hydraulic, or other controllably-extensible suspension units 18, each supporting all or one or more wheels 16 and/or axles 122; one or more controllers 300 configured to enable an operator of a bus 100 to fully or semi-automatically control operation of the ramp 200 and/or suspension units 16; and one or more sensors 182, 208, 209, 211 etc., configured to generate signals representing physical states of buses 100 and various system components and route the signals to controller(s) 300 for use in controlling ramp and suspension components 200, 18, 181, etc.

As described in further detail below, in various embodiments a deployable access ramp 200 can comprise, among other components, at least one deployable passenger support panel 10, 26, which in turn can comprise, when deployed, a distal ramp edge 202, one or more actuators 206, and one or more panel position sensors 208, 209. Actuators 206 can, for example, include one or more electric motors 217, such as stop motors, with chain drives 218, gears, drive shafts, and/or other mechanical linkages, hydraulic actuators, etc. Sensors 208 can include angle sensors, strain gauges, pressure sensors, ammeters, etc. Angle sensors 208 can be configured to generate signals representing angles of or between one or more ramp panels 10, 14, 15, 26, relative to the bus chassis, the ground, or other references or components, using for example Hall effect principles. Ammeters 208 can be configured to generate signals representing current draw or other electrical states of actuator(s) 206, such as step motors, so that, for example, when a ramp panel 10 encounters the ground or another object during deployment, any increased physical movement of the ramp can be detected by increased current draw in the actuator 206.

Some or all of actuators 206 and sensors 208, 209 can be directly or indirectly communicatively linked to controller(s) 300 for purposes of control signal communications and processing.

Thus, among other improvements the invention provides buses 100 comprising controllers 300 that are communicatively linked to or otherwise comprise sensor(s) 208 configured to sense at least one angle 274 between at least one deployable passenger support panel 10, 14, 26 and another component of the ramp; the controller 300 being configured to drive the at least one ramp panel 10, 14, 26 into a desired angular relationship with the other component of the ramp.

Extensible suspension units 18, which can for example be implemented at each of end of one or more axles 122 of a bus 100, and therefore in association with some or all wheels 16 of a bus 100, can comprise pneumatic, hydraulic, or otherwise controllably-extensible strut(s) 181 and/or bags 189; length, height, pressure, or other extension gauges or sensor(s) 182; pneumatic or other valve(s) or control unit(s) 183; and switch(es) 184; and may be communicatively liked to controller(s) 300 for purposes of control signal communications. Such units can be adapted to contract and/or extend in conjunction with deployment of the access ramp, or for other purposes. For example, such units can be configured to contract, in order to lower one side, one end, one corner, or any other portion of a bus, in order to establish, or help to establish, a desired grade of at the least one passenger support panel 104 when the distal edge 202 of the deployed ramp is in contact with a terrestrial or other surface 709 outside the bus. Operation of extensible suspension unit(s) 18 in conjunction with ramp(s) 200 can be fully or semi-automatic, as described herein. For example, in a semi-automatic configuration, an operator of the bus can use controls 350 provided on a dashboard or other surface of a bus to initiate control of either or both of ramp(s) 200 and suspension unit(s) 18, or for example on a wireless key or other device used by the operator, or by proximity devices associated with a scheduled stop, a vehicle positioning system, etc. Thus, for example, the invention provides buses 100 comprising controllers 300 configured for selective contraction, by an operator of the bus, of the suspension units 16 in conjunction with deployment of the access ramp, separately from deployment of the access ramp.

Controller(s) 122, 184, 300, 304, 308, 310, 314, 316, etc. or any desired combination(s) of them, can be provided in any form(s) suitable for accomplishing the purposes suggested or disclosed herein. They can, for example, be provided in the form of consolidated master controllers adapted for integrated processing of all sensor and command functions disclosed herein, or of various combinations of more- or less-specialized, communicatively-linked controllers such as those shown for example in FIG. 2A, 3A, or 3B, suitable for receiving command and sensor input signals, conditioning or processing such input in any required or desired ways, generating output command signals, and routing such command signals to corresponding actuators. Some or all of controller(s) 300 can further include, or otherwise be communicatively linked to, input, output, and/or input-output devices 350 such as touchscreens and other displays, switches, buttons, and keypads, in order to generate suitably-configured command signals to raise, lower, or otherwise deploy or retract ramp(s) 200; open and/or close doors 120; activate or de-activate interior and/or exterior lights and/or annunciators, including off-board devices located for example at designated passenger pick-up or drop-off sites or platforms; activate on-board and/or off-board charging devices; manipulate steering, acceleration and/or braking/deceleration systems or components; initiate desired extension and/or contraction processes of suspension unit(s) 16; etc., as described herein, and communication buses and other signal communications components 345 to route such command signals to control signal processor(s) 302, 304, 308, 310, 312, 314, 316, 122, 184, etc. and the same or other command signals to actuator(s) 206, 183, 455, 450, 451, 452, 453, 357, 200, 18, 184, 120, 183, etc., and to receive feedback in the form of pressures, positions, angles, etc., from sensors 208, 211, 209, 733, 767, 768, 208, 182, 211, 440, etc. Examples of processor(s) suitable for implementing such aspects of the invention include any general- or special purpose digital signal processors, including any suitably-configured forms of hardware, firmware, and/or software, consistent with the systems and purposes disclosed herein. Processor(s) 302 can comprise or be adapted to cooperate communicatively with any suitable network(s), communications bus(es) 375 and other forms of signal communications systems and devices in order to interact with and control sensors 182, 208, actuators 300, 302, 304, 308, 310, 312, 314, 316, 122, 184, etc.; as well as volatile and/or persistent memory(ies), including suitably-coded machine-readable instruction sets; power supplies 193, etc.

For example, in various embodiments of the invention some or all of the functions of controller(s) 300, 302, 304, 308, 310, 312, 314, 316, 122, 184, etc., may be implemented in the form of automated or advanced driver assistance systems or autonomous vehicle (ADAS/AV) controllers 300, 308, or other form of fully- or partially-automated vehicle navigation controllers including, for example, various navigation assistance and input devices such as radar(s) 227, lidar (light detection and ranging) device(s) 223, vehicle-to-component (V2X) devices, global positioning system(s) (GPS(s)) 217; near-field communication (NFC) device(s), wireless telephone, radio, or other wireless receivers and/or transmitters 219, 221; camera(s) 223; thermal imaging device(s) 229, and other sensors or sensor groups 209, 211, 224, 226, 228, etc., and corresponding software and/or firmware products adapted to accomplish the purposes suggested or disclosed herein. An example of a communications protocol suitable for use in implementing various aspects, features, and embodiments of the invention is the J1939 vehicle communications protocol promulgated by the Society of Automotive Engineers.

In various embodiments, operation of any or all of ramp(s) 200; suspension unit(s) 18; door(s) 120; interior, exterior, and off-board light(s) 130, 132, 134; charging interface(s) 800, 455; and/or other devices or components can be semi- or fully-automatically controlled, as described herein. For example, an operator control 350, 302, 300 can be provided to initiate fully or semi-automated control of a ramp and suspension system 1000 in accordance with the various aspects and embodiments of the invention.

In the same and other embodiments, one or more suspension units 18 can be configured for operation, independent of ramp(s) 200, during driving operation of the bus. For example, as described below suspension unit(s) 16 can be coupled with accelerometers 187, extension sensors 182, and/or other sensors to detect motions of the bus 100, such as rolling motions of the vehicle passenger compartment(s) about either or both of pitch axis 191 and roll axis 193 (FIG. 1), and to alternately extend, contract, or otherwise change the stiffness or other characteristics of the unit(s) 16, in order to dampen, reduce, or otherwise respond to such rolling motions. Such device(s) can, for example, be used to improve passenger comfort while the bus 100 is in operation.

In various embodiments the invention can further provide passenger and/or operator notification device(s) 357 such as lights, buzzers, audio announcements, and other sensory audio and/or visual alerts, to indicate one or more statuses of a ramp deployment process, such as "stay clear" (e.g., 'ramp deployment in process'), "proceed" (ramp deployment completed), etc., and control of such devices can be fully or partially automated using controller(s) 300, 394, 312, etc. and appropriate driver or automated initiation processes.

Diagnostic tools 470 such as off-board computers 471 and other signal processors can be used to monitor, control, update, download, upload, etc., system operations, control programs or commands, etc. by means, for example, of wired or wireless communications through diagnostic port(s) or receiver(s) 410.

Figure 2C:
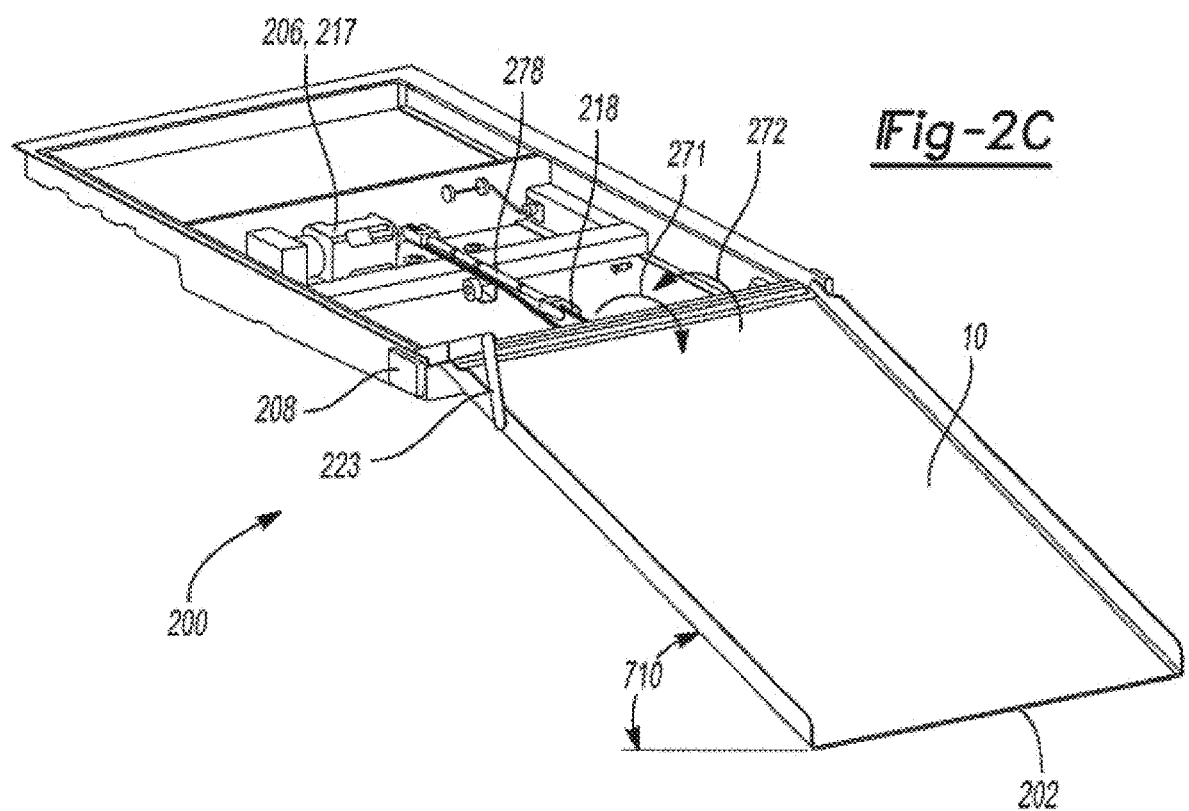
FIGS. 2C and 2D are schematic diagrams showing perspective views of components of deployable passenger access ramps in accordance with aspects and embodiments of the invention.
Figure 2D:
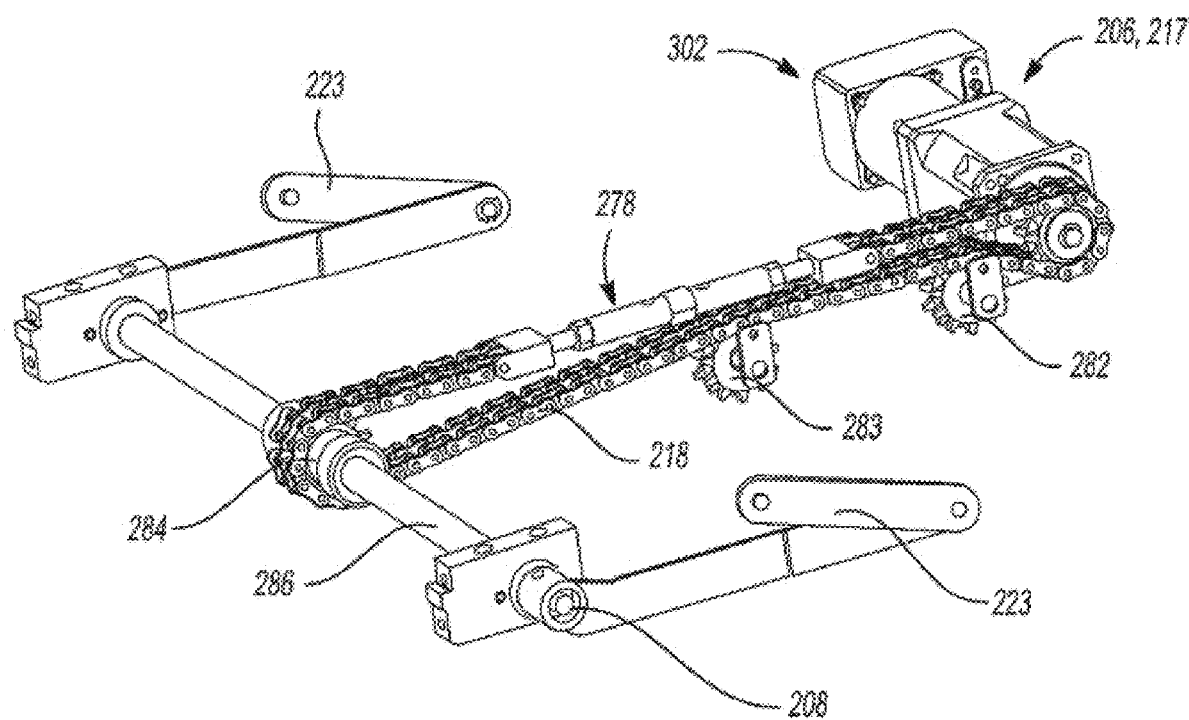

FIGS. 2C and 2D provide detail views of components of an embodiment of a ramp 200, including actuator(s) 206 and related components 217, 218, 219 and sensors 208. In the embodiment shown, actuator 206 comprises an electric motor 217, such as a step motor, which, in accordance with control signals generated by controller(s) 300, 302, 350, can rotate a gear 281 driving a drive chain 218, and thereby one or more gears 282, 283, 284, driving a rotating shaft 286 attached to one or more linkages 223, causing ramp panel(s) 10, 26, etc. to rotate in the direction of arrow 271 during a deployment process, and in the direction of arrow 272 during a retraction process. Sensor(s) 208 can be configured to provide feedback to controllers 302 in the form of signals representing an angle 274 between a ramp or floor portion 14 and a surface of ramp portion 10 (see FIG. 1), and thereby enable controller(s) 300, 302 to determine whether motor 206, 217 should drive the gear(s) 282, etc. to increase or decrease rotation of ramp portion(s) 10 in direction(s) 271, 272, so as to increase or decrease angle(s) of rotation 274.

Among the advantageous features provided by the invention is the use of a ramp actuator system such as that shown in FIG. 2b, comprising one or more electric motors 206, 217 and one or more drive chains 218 as part of a ramp drive train, wherein drive chain 218 comprises a tensioning device 278, which may for example be provided in the form of turnbuckle. Use of tensioner 278 to control tension in the chain 218 and drive train of the ramp 200 can help to achieve fine control of the deployment of a ramp 200, and therefore of angle 274, and thereby the slope 710 of a deployed ramp as explained herein. The use of such tensioners can also help to reduce and/or eliminate any slop in the chain drive system, and thereby reduce or eliminate any sudden, uncontrolled or otherwise undesirable drops in ramp panels 10, etc., for example as panels in the process of being deployed approach and pass the vertical, so that passengers or others are not harmed by sudden or otherwise unexpected movement of ramp panels.

FIG. 3A is a schematic block diagram of an embodiment of an integrated bus system 1000 in accordance with aspects and embodiments of the invention, showing additional details of components suitable for implementing a suspension system 1000 comprising a plurality of suspension units 18, and for communicating with remaining components of system(s) 1000 of a bus 100. It may be seen, for example, that in some embodiments individual extensible suspension units 18 include pneumatic bags 189, hydraulic or pneumatic cylinders 181, or other fluid vessels configured to receive pressurized air or other fluids through flow control unit(s) (PCU(s)) 183, under the control of electronic control unit(s) 184, which can receive feedback from suitably-configured pressure gauges (not shown), height and/or extension sensor(s) 182, etc., and control signals from controller(s) 300 and/or control components 350 via bus 375. By controlling fluid pressure in some or all of vessels 181, 189 controllers 183, 184, 300, 350 can control the extent of extension and/or contraction of single or multiple extensible suspension unit(s) 18. Such controlled extension and/or contraction can be used in ramp deployment and/or ride-control processes disclosed herein, for example to "kneel" a bus, dampen rocking motions, etc. Alternatively, or in addition, controllably-extensible units 18 can comprise springs, etc.

FIG. 3B is a schematic block diagram of an embodiment of an integrated bus system 1000 in accordance with the same, and further, aspects and embodiments of the invention, showing additional details of components suitable for implementing a suspension system 1000 comprising a plurality of suspension units 18, and for communicating with remaining components of system(s) 1000 of a bus 100. It may be seen, for example, that in some embodiments buses 100 comprise controller(s) 300 including some or all of ADAS/AV system(s) 308; powertrain controller(s) 310; vehicle programmable logic controller(s) (PLC(s)) 304, 312: suspension controller(s) 184; automatic traction controller(s)/automatic/anti-lock braking system(s) 314, which can for example include drum and/or disc brakes, electro-mechanical, and other forms of braking or deceleration components; door controller(s) 122; and telematics/geo-fencing, and/or other types of telematic control modules 316; sensors to provide input to the various controllers; and actuators to execute commands generated by the controllers, as shown.

As further shown in FIG. 3B, some or all of controllers 300, 302, 304, 308, 310, 312, 314, 316, 122, 184, and/or other components of system(s) 100, can be communicatively linked by vehicle communications bus(es) using appropriately-configured communications standard(s), such as Controller Area Network (CAN bus) protocols, configured to allow devices to communicate with each other's applications without requiring a host computer, through use of message-based protocol(s). For each device or component (including for example all the devices and components shown in the figures), data can for example be routed sequentially in frames transmitted in such ways that if more than one device transmits at the same time the highest priority device is able to continue while communications from others is suspended.

In some embodiments individual extensible suspension units 18 include pneumatic bags 189, hydraulic or pneumatic cylinders 181, or other fluid vessels configured to receive pressurized air or other fluids through flow control unit(s) (PCU(s)) 183, under the control of electronic control unit(s) 184, which can receive feedback from suitably-configured pressure gauges (not shown), height and/or extension sensor(s) 182, etc., and control signals from controller(s) 300 and/or control components 350 via bus 375. By controlling fluid pressure in some or all of vessels 181, 189 controllers 183, 184, 300, 350 can control the extent of extension and/or contraction of single or multiple extensible suspension unit(s) 18. Such controlled extension and/or contraction can be used in ramp deployment and/or ride-control processes disclosed herein, for example to "kneel" a bus, dampen rocking motions, etc. Alternatively, or in addition, controllably-extensible units 18 can comprise springs, etc.

FIG. 4 provides schematic side views of embodiments of passenger access ramps 200 in accordance with various aspects and embodiments of the disclosure. FIG. 4B depicts a prior art problem, in that inside a bus 100, between interior floor panel 14 and an interior ramp panel 15 there exists a break or surface discontinuity 19, resulting in a change 715 in slope or grade of the ramp/floor surface inside the bus. In prior art buses, such discontinuities have been caused, for example, by a need to lower the threshold 114 of passenger door 112 as low as possible to the ground or other surface 709, in order to minimize a slope 710 of outer panel(s) 10 of the ramp 200.

FIG. 4B illustrates a solution offered by the invention; namely, use of extensible suspension unit(s) 18 (not shown in the figure) to raise a distal side of the bus 100, and thereby eliminate the discontinuity or break 19, providing a constant-slope ramp 23 inside the bus, formed by floor panel 15 and interior ramp panel 14. In the example shown, without extension of the distal side extensible suspension units 18, discontinuity 19 is associated with a break angle 715 of 6.13 degrees; extension of distal side suspension units 18 by an amount sufficient to tilt the bus 6.13 degrees eliminates the break angle (i.e., reduces it to zero degrees).

As previously mentioned, one of the significant improvements offered by the invention is the integration of suspension and passenger access ramp systems for passenger buses. The use of integrated systems 200, 18, in conjunction with controllers 300, etc., enable a very wide variety of functions to be implemented. For example, controllers 300 can be used to set reaction and deployment times for suspension units 18 and/or ramps 200. Thus for example a bus can be 'kneeled' by kneeling both sides of a front axle, to lower the entire front end 102 of a bus, so as to reduce sill height 724 and thereby make it easier for passengers to board the bus. The rate at which the front suspension units 18 are contracted in order to do so can be varied, depending upon local rules, passenger requirements or comfort needs, operator preferences, etc. For example, a controller 300 can send signals to valve(s) 183 to ensure that one or more extensible suspension units 18 be 25 contracted or extended at a rate not to exceed a desired value, such as 1.25 inches per second.

When passengers have boarded, or when it is otherwise determined that a bus should be returned to a normal operating condition, the suspension can be caused to extend at any desired rate. For example, valve(s) 183 can be controlled so as to cause the front end of a kneeling bus 100 to rise to a normal operating height from a kneeling condition in seven seconds or less, and/or to a minimally safe operating height within about four seconds, so that the bus can continue driving or other operations while the process of returning the bus to normal operating height continues. The same, similar, and optionally different conditions can be enforced for curb side kneeling.

Extensible suspension units 18 in accordance with the invention can also be used to raise or lower the height at one or more axles 122 of a bus 100 in order, for example, to allow for safer and more convenient passenger egress at raised platforms, and/or to control break-over and departure angles for particular road conditions. For example, the floor 145 of a bus can be raised to three inches or more above normal operating height, in order to ensure that sill 125 of a door 120 is at the same level as a passenger platform. In addition, in accordance with various embodiments, the invention can provide systems 1000 adapted to accommodate passenger loading at platforms or other facilities 709 by any or all of navigating to the facility 709 and orienting the bus axially and laterally in a desired juxtaposition to the facility; tilting left or right, raising or lowering the front and/or rear of the bus to accommodate battery charging interfaces 455; turning on or off on-board or off-board lights 130, 134; making passenger announcements using on-board or off-board speakers; opening and/or closing doors 120, etc., as explained herein.

In general, raising or lowering of extensible suspension units 18, opening closing doors, operating charging interfaces, lights, and annunciation systems, etc. as described herein can be tied to any of manual switch controls input by a driver or other operator of a bus 100, a detected speed of the bus, or any other suitable parameter(s).

As previously mentioned, passenger access ramps 200, doors 120, lights and annunciation systems in accordance with the invention can be operated in a number of modes, under fully- or partially automatic control of controllers 300, 302, etc.

For example, in one example of an automatic mode, a passenger access ramp can be deployed automatically, in such manner as to minimize extension and/or contraction of extensible suspension unit(s) 18 while establishing desired ramp slopes or grades. Such modes can be helpful, for example, in complying with regulatory schemes such as applicable sections of the Americans with Disabilities Act (ADA) and/or saving time that might otherwise be spent in raising or lowering suspension units. In one example, the bus 100 can initiate deployment automatically, when a controller 300 has determined that the bus is in a proper operating condition. For example, upon selection by a driver or other operator of a bus 100, through the use of a control switch 350, etc., or automatically upon determination by a controller 300 is in a specified location:

1. The controller 300 can poll a speedometer, global positioning system (GPS), and/or other rate or location sensor(s) 211 to confirm that the bus 100 has been brought to a stop at a bus stop, bus terminal, roadside, parking lot, or other suitable passenger loading area or facility.
2. When the bus 100 is confirmed to be stationary, it can further be placed in a safe condition for passenger boarding. For example, interlocks and other brake/control systems 450, 451 can be applied automatically by the system 1000, and any engagement of any other locks, interlocks or other safety devices 450 confirmed, either automatically or upon command by a driver or other operator.
3. Controller(s) 300, 302, can poll all relevant bus systems to ensure that any additional required or desirable conditions are met. Desired door status (open/closed), parking brake status, vehicle speed, transmission status, and ramp status can be confirmed and/or enforced, among others. In electric buses, pantograph(s) and/or other charging equipment 455 can be placed into a desired safe condition by for example confirming they are not engaged with live charge currents.
4. When any or all safety/operating conditions are confirmed, ramp deployment action(s) can be initiated automatically, based on bus location (e.g., through the use of GPS and/or radio-based geo-fencing techniques as described below), or on explicit command of a driver or other operator, by for example operating a control switch of a dashboard or controller 157, 300, 350, etc.
5. Alternatively, or in addition, for some or all embodiments one or more safety or other operating conditions can be set or otherwise enforced by a controller 300, 350, etc., in response to selection by a driver or other operator of a bus 100 of a suitable control switch setting, regardless of current operating condition. For example, a driver can set a ramp control switch to 'deploy,' while the bus is in motion and 100 meters from a scheduled stop, and the controller 300 can generate signals commanding any or all of brakes 451, door locks 112, accelerators and transmissions 452, etc., to assume a desired condition for stopping the bus, placing the bus in a suitable operating condition (e.g., stopped, doors unlocked, brakes locked, pantograph(s) stowed or securely engaged, refueling access closed and locked, etc.) before initiating ramp deployment.
6. In embodiments in which undeployed passenger ramps 200 are stowed in an interior of the bus, for example in such manner as to form a floor or other portion of a passenger entryway or vestibule of the bus when not in use, a passenger door 112 adjacent to the ramp 200 can be opened, e.g., manually by the driver.
7. After confirming that all appropriate safety and operational conditions are met, a driver or other ramp operator can activate a suitably-configured switch or control 350, located for example on a driver's dashboard 157 of the bus 100, to place system 1000 in an automatic kneel-deploy mode. Passenger warning/notification device(s) 357 can be placed in a state indicating that ramp deployment operations are in progress, and that passengers and others should stand clear and remain alert, and doors 112, 120 can be unlocked and optionally opened automatically.
8. Actuator(s) 206 can cause the ramp 200 to deploy from the stowed position at controlled rate(s), to, through, and past the vertical, and ultimately to a horizontal or other desired state. Optionally, any passenger warning/notification devices 357 can be activated to provide audio, visual, and/or other sensory indications that the ramp is in motion.
9. Passenger warning/notification device(s) 357 can be placed in a state whereby an indication is provided that passenger ingress or egress is authorized.

Thereafter, deployment can continue in either of at least two optional modes, which may be selected automatically, or manually by a driver or other operator of the bus 100 by means of a switch or other control 350:

Scenario 1
1. If contact by any portion of the ramp 200 with ground, curb, or other object 709 is sensed by an angle sensor 208 (or high current draw on an ammeter 208) prior to meeting or exceeding an ADA- or other specified angle (e.g., 9.5 degrees), controller(s) 300, 302 can suspend deployment of the ramp and relax the drive motor 217 or other actuator 206. In such a case, no kneeling or other action by extensible suspension unit(s) 18 may be required.

Scenario 2
2. If one or more angle sensors 208 indicate that a desired ADA- or other angle (e.g., 9.5 degrees) is being approached or has been achieved or exceeded, controller(s) 300, 302 can suspend deployment and hold the ramp in a current potion.
3. Controller(s) 300, 302, can generate instruction signals causing one or more extensible suspension units 18 to initiate a kneeling or rising operation, for example to tilt the bus chassis and continue rotation of the ramp 200 relative to the ground or other surface 709, or to tilt the bus in the opposite direction to counteract an over-deployment. In a preferred example embodiment, a first extensible suspension unit 18, disposed at a wheel 16 adjacent to or otherwise closest to the passenger access door 112, can be contracted, causing a single corner of the bus 100 near the door to kneel. Kneeling can continue until ramp sensor(s) 208 sense contact with curb or other object 709, for example, due to detection of reverse rotational motion by an angle sensor and/or ammeter 208.
4. If contact with ground or other object 709 is not sensed by sensor(s) 208 when contraction (or extension) of the first suspension unit 18 has completed (i.e., when the bus has kneeled or tilted as far as a single suspension unit can accomplish), suspension controller(s) 300, 302, 183, 184 can initiate kneeling (contraction or extension) of any one or more further suspension unit(s) 18 on the same side 104, front 102, or other portion of the bus as the first, fully contracted (or extended) unit. For example, all remaining extensible suspension units 18 on a curb side of the bus 100 can be caused to kneel.
5. If contact with the ground 709 or other object is not sensed when any further kneeling conducted at (12) is completed, suspension controller 300, 302, 183, 184 can initiate extension (raising) of the suspension units 18 on the opposite side.
6. If contact with ground or other object 709 is not sensed when the opposite side raise has reached full extension or other set limit (e.g., maximum desired or permissible tilt of passenger compartment), controller(s) 300, 302 can cause ramp 200 to resume deployment (e.g., past 9.5 degrees) until contact with ground or other object 709 is sensed, or ramp travel limits have been reached; e.g. past desired slope limit.

7. Passenger warning/notification device(s) 357 can be placed in a state whereby an indication is provided that passenger ingress or egress is authorized. If a desired ramp angle has been exceeded, the same or other warning device(s) 357 can so indicate.

Stow Operation:

1. When all desired passengers have entered and/or exited the bus, or when it is otherwise safe or desirable to retract the ramp, the driver or other operator can manually activate a switch or control 300, 350 to initiate a stow operation.
2. In response to activation of control 300, 350, controller(s) 300, 302, etc., can initiate a ramp stow process, reversing deployment of the ramp by any desired sequence of operations. Warning/notification devices 350 can generate warning signals as desired.
3. At a desired stage of the stow process, e.g., when one or more ramp panels 10, 14 have reached the vertical, controller(s) 300, 302, 183, 184 associated with any contracted or extended suspension units 18 can cause the suspension units to be returned to, or otherwise placed in, an operational (driving) height, for resumed operation of the bus 100.
4. When proximity and/or angle sensor(s) 209 indicate that the ramp 200 is in a desired stowed position, actuator(s) 206 can be placed in a standby mode, or otherwise deactivated.
5. Passenger warning/notification device(s) 357 can be placed in a state indicating that ramp stowage is complete.
6. Any interlocks or other bus systems placed in a safe condition at steps 2 and/or 3 of the deployment process can be returned to operating condition and the bus can resume driving service.

As another example, in a second mode a passenger access ramp can be deployed automatically, in such manner as to establish and optionally maintain a constant slope or grade between any desired panels 10, 14, 15, etc.:

1. Bus 100 can be brought to a stop at a bus stop, bus terminal, roadside, parking lot, or other suitable passenger loading area or facility 700 and, as described above, when the bus 100 is stationary, it can be placed in a safe condition for passenger boarding. For example, brakes and other interlocks 450, 451 can be applied automatically by the system 1000, and any other locks, interlocks 451 or other safety devices, 450, 451, 452 engaged or placed in other desired condition(s) as described above.
2. Controller(s) 300, 302, can poll all relevant bus systems to ensure that any additional required or desirable conditions are met.
3. In embodiments in which undeployed passenger ramps 200 are stowed in an interior of the bus, for example in such manner as to form a floor or other portion of a passenger entryway or vestibule of the bus when not in use, a passenger door 112 adjacent to the ramp 200 can be opened, e.g., manually by the driver or automatically by the controller 300.
4. After confirming that all appropriate safety and operational conditions are met, the ramp operator can activate a suitably-configured switch or control 350, located for example on a driver's dashboard 157 of the bus 100, to place system 1000 in a constant slope-control mode.
5. Controller(s) 300, 302, etc., can generate suitably-configured control signals to cause actuator(s) 206, etc., to begin deployment of the ramp 200 from a stowed position.
6. Passenger warning/notification device(s) 357 can be placed in state(s) indicating that ramp deployment operations are in progress, and that passengers and others should stand clear and remain alert.

Scenario 3

7. Actuator(s) 206 can cause the ramp 200 to deploy from the stowed position at controlled speed(s), to and past the vertical, and ultimately to a horizontal or other desired state. Optionally, any passenger warning/notification devices 357 can be activated to indicate that the ramp deployment is in action.
8. If/when contact with a curb or any other object 709 sensed by angle or high current draw sensor(s) 208, prior to establishment of desired ramp angles, the controller(s) 300/actuators 206 suspend operation and stop or otherwise relax the drive motor.
9. Controller(s) 300, 302, etc. initiate a process of comparing angle indicator(s) 208 provided by Hall effect sensors or other angle- or position-sensitive devices between adjacent ramp panels 10, 14, 15, until a set standard for constant ramp slope (e.g., less than or equal to 2 degrees difference between adjacent ramp panels) is established.
10. Passenger warning/notification device(s) 357 can be placed in a state whereby an indication is provided that passenger ingress or egress is authorized.

Scenario 4

1. If acceptable constant-slope ramp angles (within a desired tolerance, e.g., not more than 2 degrees difference between adjacent panels 10, 14, 15) are reached before ground or other contact, controller(s) 300, 302 can suspend ramp deployment and hold ramp at constant slope angle position.
2. Controller(s) 300, 302, 183, 184 can initiate kneeling/contraction operations with respect to a first extensible suspension unit 18, e.g., the unit closest to the passenger ramp.
3. If contact with ground or other object 709 is not sensed when a first kneeling operation is completed, suspension controller(s) can initiate second (e.g. door side) suspension kneeling.
4. If contact with ground is not sensed, any further kneeling process is completed, controller(s) 300, 302 can resume ramp deployment until maximum desired slope (e.g. ADA slope limit) is reached, then suspend ramp deployment.
5. Opposite side suspension unit(s) 18 can be raised initiated until ramp contact with ground is sensed.
6. If contact with ground not sensed when left side raise reaches set limit, ramp controller can resume ramp deployment until contact with ground sensed (or ramp travel limits reached); e.g., past desired slope limit.
7. If on contact with ground ramp slope or angle exceeds a predetermined limit, warning/notification device(s) 357 can be activated to warn passengers of possible steep conditions.

Stow

1. Stow operations can proceed as outlined above with respect, for example, to Scenarios 1 and 2.

It should be noted that at any time in any of the foregoing processes one or more current-draw sensors or other sensors 208 indicate that an obstruction 709 has been encountered by any portion of a ramp 200, deployment of the ramp can be automatically suspended.

Thus it may be seen that in accordance with various aspects and embodiments the invention provides control modules or controllers 300 for passenger bus(es) 100, examples of such passenger bus(es) comprising a body 102 supported by a frame 140 and housing a plurality of passenger seats; at least one passenger access door 120 configured to enable passenger access through at least one side 104, 106 of the body; and a plurality of vehicle exterior condition sensors 250, the plurality of vehicle exterior condition sensors 250 comprising at least one of some or all of a passenger presence and/or vehicle navigation sensor 209, 211, 224; a steering controller 308, 453; a speed controller 308, 310, 451, 452; an extensible suspension controller 184, 455; and a passenger access door controller 120, 122. The controllers of such bus(es) 100 can be configured to receive from the vehicle navigation sensor(s) 209, 211, 224 signals indicating some or all of a position and orientation of the passenger bus 100, and a speed at which the passenger bus is moving; receive from the passenger presence detector(s) 209, 211 signals indicating the presence of a passenger; generate, based at least on the signals indicating a position, orientation, and/or speed of the passenger bus, signals adapted for causing some or all of the steering controller 308, 453 and the speed controller 308, 310, 451, 453 to navigate the passenger bus to a desired location relative to a passenger loading facility 709 and place the passenger bus 100 in a stopped passenger loading condition; route the signals for navigating the passenger bus to some or all of the speed controller 308, 310, 451, 452 and the steering controller 308, 453; and, when the bus is in a stopped passenger loading condition, route to the at least one passenger access door controller 122, 120 signals adapted to cause the passenger access door controller to open the passenger access door 120.

In the same and further embodiments, such control module(s) 300 can also, or alternatively, comprise components configured, based at least on the same or other signals indicating a position and orientation of the passenger bus relative to a passenger loading facility 709, to generate signals adapted to cause the at least one extensible suspension controller 183, 184, 455 to expand or contract one or more of the bus's suspension units in order to place at least a portion of the passenger access door 112, 120 in a desired juxtaposition to the passenger loading facility.

In accordance with such embodiments, vehicle exterior condition sensors 211, 209 can, for example, include some or all of GPS systems 217; geofence devices; cameras 225; lidar devices 223; resistance and/or angle position meter(s) 208, e.g. to detect obstructions or limitations in freedom of motion. Vehicle exterior conditions monitored by such devices can, for example, include some or all of exterior topography, such as gates, platforms, objects in the vehicle's path; overhangs and other overhead objects; the presence of passenger(s) and/or their proximity to or location relative to a platform or loading site; the presence of a platform and/or its relative or absolute geographic location; the absolute or relative height of a platform; the absolute or relative location and/or orientation with respect to any other object(s); time of day and/or light conditions, weather, etc.; and/or any of a wide variety of conditions at or on a passenger loading platform or location, including for example weather, radius of curvature of platform, presence of passenger assistance device, e.g., wheel chair, walker, bicycle or stroller. It will be understood by those skilled in the relevant arts that such sensors, and others, can be used to detect or otherwise assess a wide variety of vehicle exterior conditions using known methods of application, and they will not be troubled in implementing at least basic functionality with respect to such assessments.

For example, the invention enables fully- or semi-automatic identification of the presence of one or more passenger(s) at a bus stop 709, navigation of the bus 100 to a safe and/or otherwise preferred juxtaposition to the stop 709 and stopping the bus 100 in a safe place, changing the height of some or all of the wheels 16 to accommodate access by the passenger(s), and opening a passenger door 120, and optionally turning on interior and/or exterior lights 357, deploying a ramp 200, making any desired announcements, such as route stop, or other information, and, when all passenger(s) have boarded safely, closing the door 120 and returning the bus 100 to a route service condition in which it is ready to manually, automatically, or semi-automatically proceed to one or more next passenger collection points 709.

The navigation of the bus to stop(s) 709 and/or other locations, and placement of the bus 100 into desired juxtapositions relative to such locations, can be based on digital topographical and/or geographical maps, and/or on the use of any or all of sensor(s) 250 to determine the contours or proximity of any objects within the vicinity of the bus, without reference to previously-stored maps.

In such embodiments a vehicle ADS 308 can first identify the presence of a passenger, for example by use of camera(s) 225 and/or optionally with additional multiple sensing devices or technologies 209, 223, 225, 227, 229, eg., thermal devices 229 and/or LIDAR devices 223 in the area of a known stop 709.

In some embodiments, the presence of passenger(s) can be detected by identifying forms corresponding to human beings or other passengers, e.g. through facial or body recognition algorithms, etc. thus requiring the passenger(s) to take no action other than to ensure their presence within the confines of a designated stop location 709, and or making a gesture such as raising his/her arm.

In the same and other embodiments, passenger(s) can announce their presence by pressing a call button 736 or other device external to the bus and optionally located at or on a passenger platform or other structure 709, which call button can communicate with ADS 308 or other controller by illuminating a call light, sending a wireless signal, etc., for interpretation by sensor(s) 250 such as NFC or other wifi device 219, or a cellular device 221, or by radio etc.

Alternatively, or in addition, vehicle infrastructure communication devices or systems can be used to simply and improve interior communications between devices. For example, an ADS system 308 can be simplified by using wifi device(s) 219, infrared signals 229, etc., to signal passenger presence as a bus 100 approaches a passenger facility 709.

In further aspects and embodiments, the invention provides control modules 300 for passenger buses 100 adapted to facilitate passenger loading and/or unloading. For example, a system 1000 in accordance with such aspects can comprise a control module 300 for a passenger bus 100, the passenger bus comprising a body 102 supported by a frame 140 and housing a plurality of passenger seats; at least one passenger access door 112, 120 configured to enable passenger access through at least one side of the body; and at least one vehicle exterior condition sensor 209, 211; the control module 300 comprising at least one controller 304, 308, 312 configured to receive from the at least one vehicle exterior condition 209, 211 sensor signals representing at least one vehicle exterior condition; based at least partly on the at least one vehicle exterior condition, generate signals adapted to cause at least partially automatic operation of at least one passenger embarkation component of the passenger bus such as a door 112, ramp 120, 200, light 357, etc.; and route the generated signals to the at least one passenger embarkation component.

Sensor(s) 250 such as lidar components 223, cameras 225, GPSs 217, etc., can also be adapted to provide information to controller(s) 300, 304, 308, 312, etc., concerning other special condition(s) at platform(s) 709 or other locations, such as weather, radius of curvature of platforms, presence of passenger assistance devices such as wheel chairs, walkers, bicycles or strollers, especially by using visual, infrared, laser, and/or other image and data interpretation and mapping schemes, including artificial recognition and other machine vision techniques.

Thus for example the invention enables buses 100 comprising controller(s) 300 configured for identifying the presence of a passenger at a bus stop 709 having a curved platform, curb, or other feature, and for causing the bus to come to a stop at the passenger location, changing vehicle height and opening the door, some of these actions based on topography at and within the vicinity and/or approaches to the bus stop.

For example, a vehicle ADS 300, 304, 312 can first identify a passenger, for example by camera 225, combined with another or multiple sensing technologies 211, 209 (e.g., thermal imaging and/or LIDAR sensors 223, 229) in the area of a known stop 709. Machine Learning & Deep Machine Learning applications executed by processor(s) 300 can be used to teach the processors 300 to classify targets like traffic signals, obstacles, people. For example, a system 300 can identify an object as "human" by camera/thermal sensors 223, 225, 227, 229 and classify as "passenger" by the "human" target approaching the boarding door location 112 by LIDAR 223 sensing the "human" trajectory towards the loading zone or making a visible gesture, such as raising an arm.

In addition, or alternatively, vehicle infrastructure communication devices such as communication bus(es) 345 can be used to simplify the ADS system 300, 304, 308, 312 significantly. V2I devices can include simple wifi communication system(s) 219, 221 to receive signal from a call signal device, including an application on a cell phone or other mobile device, manually or automatically activated by a passenger who desires to board the bus 100, and/or a platform-mounted infrared device 736 that signals the vehicle on the approach of the boarding intent.

Thus for example the invention provides, in various aspects and embodiments, control module(s) 300 described above, wherein the at least one passenger embarkation component comprises the at least one passenger access door 120; the at least one vehicle exterior condition sensor comprises at least one passenger presence detection device 219, 221, 223, 225, 227, 229, 209, 736; the at least one vehicle exterior condition comprises the presence at passenger embarkation location 709 of at least one bus passenger; and the generated signals comprise at least one passenger access door actuation command.

In accordance with the same and other embodiments, the invention provides control module(s) 300 described herein, wherein the passenger bus 100 comprises at least one speed controller 451, 452 and at least one steering controller 453; the at least one vehicle exterior condition sensor comprises at least one vehicle orientation sensor 217, 223, 225, 227, a compass or inertial navigation system, etc., and the controller 300 is configured to receive from the at least one speed controller 207, 211, 217, 227, etc., signals indicating a speed at which the passenger bus is moving; receive from the at least one vehicle orientation sensor 217, 219, 223, 225, 227, at least one of a location of the passenger and an orientation of the passenger bus relative to a passenger loading facility; based at least partly on the signals received from the at least one speed controller and the at least one vehicle orientation sensor, generate signals adapted to cause the steering controller and the speed controller to at least partially automatically navigate the passenger bus to a stop at a predetermined location and orientation with respect to the passenger loading facility; and route the generated signals to the at least one speed controller and the at least one steering controller. Thus for example the invention provides the capability of automatically navigating or directing, e.g. decelerating, steering and bringing to a stop the vehicle at a designated boarding location 709 after detection of a passenger waiting at or approaching the designated location.

Passenger presence device(s) 211 in accordance with the various aspects and embodiments of the invention can include any or all of geo-fencing components, thermal imager(s) 229, light detection and ranging (LIDAR) device(s) 223, camera(s) 225, and receiver(s) 219, 221 configured to receive from off-board passenger presence annunciator signal device(s) 736 representing a declaration of the presence of at least one passenger. These can for example include providing at a passenger collection point 709 a push button 736 at the bus stop and wireless router 136, an App on a smart phone, and/or other devices.

Passenger embarkation component(s) 351 can further include exterior passenger access light(s) 357, light meter(s) and/or other exterior light condition sensor(s) 135; so that exterior light(s) 130, 134, etc., can be activated when the sensed vehicle exterior condition comprises a low light level by generation and routing of one or more light actuation commands. Light condition sensor(s) 135 can further include clock components and wireless signal receiver(s) 136 adapted to receive and relay signals representing ambient conditions at a passenger access location.

In further aspects and embodiments, bus(es) 100 can comprise one or more annunciator(s) 133 (e.g., loud speaker(s)); the at least one vehicle exterior condition sensor can comprise at least one passenger presence detection device 211, 209; the at least one vehicle exterior condition can comprises the presence at passenger embarkation location of at least one bus passenger; and signals generated by controller(s) 300 can comprise at least one live or pre-recorded passenger access announcement instruction, to be automatically announced by a loudspeaker or other device.

In the same and further embodiments, the at least one passenger embarkation component 351 can comprise at least one deployable passenger access ramp 200, 206; and the signals generated by controller(s) 300 can comprise signals adapted to cause at least partially automatic deployment of the passenger access ramp.

In the same and further embodiments, the at least one passenger embarkation component 351 can comprise at least one extensible suspension controller 184, 12, and signals generated by controller(s) 300, 184, 18 can be adapted to cause an extensible suspension controller 184, 18 to at least partially automatically extend or contract at least one extensible suspension unit 18 associated with an axle of the passenger bus.

In the same and further embodiments, the at least one vehicle exterior condition sensor 211, 209 comprises at least one device 217, 219, 221, 223, 225, 227 configured to provide to the control module signals representing a determined location of the passenger bus; and based at least partly on the determined location of the passenger bus 100, the control module 300 is configured to generate at least one passenger access door actuation command. The determined location of the passenger bus can, for example, comprise either or both of an absolute location of the bus and a location of the passenger bus relative to a passenger embarkation facility. Thus for example the bus 100 can be driven into a desired proximity of a passenger embarkation facility 709 and one or more doors 120 can be opened. In some embodiments, the bus 100 can comprise multiple doors 120, e.g., one on a left or 'street' side, and the other on the right or 'curb' side, and depending upon the location and the configuration of the passenger facility 709, either or both doors can be fully- or partially-automatically opened. In other words, for example, at some locations the control module 300 can be configured to generate at least one passenger access door actuation command configured to actuate less than or all of the plurality of passenger doors 120. Thus door operations can be based on a variety of factors, including some or all of stop/vehicle location and/or presence of passenger. For example, in some circumstances passengers or operators may wish to use streetside doors only at certain stops, curbside doors only at other stops, and/or both side doors at some stops. Thus for example, in some embodiments it can be advantageous to tie door selection for operation into GPS locations of bus stops 709.

As previously described, in various aspects and embodiments the invention provides buses 100 comprising control module 300, and vehicle exterior condition sensor(s) comprise device(s) 209, 211 configured to provide to the control module 300 signals representing a determined location of the passenger bus 100; at least one passenger embarkation component comprises an extensible vehicle suspension system 184, 18; and based at least partly on the location of the passenger bus, the generated signals comprise at least one signal configured to cause extension or contraction of components of the extensible vehicle suspension system associated with at least one wheel of the passenger bus. Such configurations enable, for example, kneeling and/or raising of all or portions of a bus, for example to increase or decrease ground clearance to clear obstructions in streets, parking lots, maintenance yards, etc., and/or to clear overhead obstructions such as low maintenance door bays, passenger stop shelter roofs, etc., based on any or all of vehicle proximity to one or more stop 709, presence of one or more passengers at loading points 709, based only on location, and optionally while the bus is moving.

As previously noted, exterior condition sensors 250 can include motor RPM sensors, current sensors, angular position sensors and other sensors 207, 208, adapted to determine that a ramp 200 being deployed in accordance with the disclosure has encountered an obstruction, such as a stone, a curb, debris, or other object, and is thereby blocked from deploying properly to a desired deployed configuration, for example a desired ramp angle, sill height, etc. For example, if a ramp 200 encounters a stone or other obstruction before reaching a desired angular or height configuration, a current sensor 207, 208 can be adapted to register a rise in current as the ramp motor attempts to completed the desired deployment. This can controller(s) 300, 304, 312 etc., to compensate in a variety of ways, including for example by causing suspension system 182, 184, 18 to kneel or rise, bus 100 to navigate to a location more suited for ramp deployment, etc.

Thus for example in accordance with some aspects and embodiments the invention provides buses 100 comprising control module(s) 300, 304, 312, one or more vehicle exterior condition sensors 224 comprising one or more devices 207, 208, etc., configured to provide to the control module signals indicating that a deployable passenger access ramp has encountered an obstruction, and one or more passenger embarkation component(s) comprising at least a deployable passenger access ramp 200. Based at least partly on receipt from the sensor(s) 224, 207, 208 of a signal indicating that the deployable passenger access ramp 200 has encountered an obstruction, the controller(s) 300, 304, 312 can generate signals configured to suspend deployment of the deployable access ramp. For example, an angle sensor 208, ramp motor speed sensor 207, can route a motor speed J1939 message to a PLC controller 300 and a timer associated with the controller can determine that the ramp 200 has encountered obstruction, can alert an operator of the bus 100 with an audible signal using a dashboard- or otherwise mounted loudspeaker or signal generator, and move the ramp 200 to a vertical position for the operator to determine an appropriate action from this safe ramp position for resolving the issue and properly deploying the ramp 200.

In some embodiments of such aspects of the invention, a position and/or velocity encoder 207, 208 can be used to determine that an obstruction has been encountered. For example, when a ramp deployment speed drops to zero, or to a value lower than that expected during normal ramp operation, and/or when a ramp or ramp panel angle sensor indicates that a proper ramp or ramp panel angle 710, 711, 715 has not been has not been achieved within an expected amount of time, ramp deployment can be suspend until corrective action has been taken.

Further aspects and embodiments enable fully- and/or semi-automatic processes for properly configuring a bus 100 for depot or on-route charging. For example, as shown in FIG. 7, a bus 100 comprising an overhead charging apparatus such as rails 170, and/or side-accessed charging interface 172 can be properly aligned for overhead or side charging by deployment of extensible suspension components 18 to level or otherwise adjust a roll and/or pitch angle of the bus 100, Thus in various aspects and embodiments the invention provides buses 100 having energy storage system 455 comprising batteries and/or other energy storage devices comprising fixed and/or deployable charging interfaces such as contact charge rails 170 and/or plug-interfaces 172, one ore more vehicle orientation sensors 211, 209 comprising for example device(s) 217, 219, 221, 223, 225, 227, etc., configured to provide to the control module signals representing a determined location of the passenger bus; and at least one device 182, 184, etc. configured to provide to the control module signals representing a level status of at least one axle 122 of the passenger bus 100; wherein the control module(s) 300, 184, etc. are configured to, based at least partly on the determined location of the passenger bus 100 and the level status of the at least one axle 122 of the passenger bus, generate signals adapted to cause at least partially automatic operation of at least one component 18 of an extensible suspension 18, 182,184 system associated with at least one end of the at least one axle. In addition, or alternatively, such a bus 100 can comprise a pantograph or other external overhead charging system 800, 802 that is at least partially automatically deployable, and the control module 300 can be configured to, based at least partly on the determined location of the passenger bus and the level status of the at least one axle of the passenger bus, generate signals adapted to cause at least partially automatic deployment of the overhead charging unit.

For example, such systems can allow the vehicle 100 to self-level to the overhead charger 800, 802 to adjust for road inconsistencies, in particular road crown. As is understood by those skilled in the relevant arts, charging systems 800 involving pantographs 802 and other deployable interfaces often have limited ranges of misalignment they can accommodate in engaging to charge.

With charging interfaces 800 correctly aligned and deployed, controller(s) 300 can initiate and control suitable charging processes in order to charge the bus battery system or other energy storage system.

A further constraint can be imposed by a maximum distance 806 through which a deployable charge interface 800 can be deployed, so that extensible suspension controllers 18, 182, 184 can be used to raise or lower, as well as tilt (roll or pitch) the bus 100 in order to accommodate charging. Similarly, orientation, location, steering and speed controllers 228, 217, 219, 223, 225, 227, etc., can be used to place the bus 100 at a proper spacing 808 from and angular relation to the passenger platform or charging station 709, as described herein.

Similarly, in various aspects and embodiments combinations of steering, speed, position, location, and suspension controllers 228, 217, 219, 223, 225, 227, 182, 184, 18, 300 can be used to control a gap 810 between a bus 100 and a loading platform 709. For example, in such embodiments a control module 300 can be configured to receive from at least one vehicle orientation sensor 211, 209 signals representing at least one vehicle orientation condition relative to a passenger loading facility, charge station or other external object 709; based at least partly on the at least one vehicle orientation condition, generate signals adapted to cause at least partially automatic operation of at least one component 18, 182, of an extensible suspension system associated with at least one end of at least one axle 122 of the bus in order to minimize or otherwise control a gap 810 between at least a portion of the passenger door 112, 120 and the passenger loading facility 709; and route the generated signals to the at least one component of the extensible suspension system.

FIG. 5 provides schematic side and perspective views of embodiments of components 181, 182, 183 of an extensible suspension unit 18 in accordance with aspects and embodiments of the invention. An extensible strut unit 18 can include one or more proportional valves 183, for smoother and more precise control of fluid flow into or out of strut 181, pressure sensors for precise control of pressure within strut 181, and one or more integral or communicatively linked electronic control units 184, including for example dedicated suspension processors with onboard diagnostic devices, including accelerometers 187 and/or other sensors.

A significant and advantageous application enabled by suspension units 18 in accordance with the invention is improved active roll controls for passenger buses, configured to reduce and/or dampen rolling and other motions sensed by passengers within body 103 or other passenger housings. For example, through the use of high-speed data processors to interpret and respond to inputs from height detectors 182, accelerometers 187, pressure gauges, switch positions, and/or other sensors, a suspension system 18 in accordance with the invention to can reduce or eliminate rolling and other undesirable motions about a longitudinal axis 193 (FIG. 1) of a passenger bus body by alternately stiffening or extending or softening or contracting one or more units 18 to counteract rolling motions caused by operation of the bus on uneven roads, etc. Proportional valves, for example, can provide very smooth height changes for strut(s) 181.

An example of response to such a system is shown in FIG. 6. In the example shown, rotational accelerations 622 about a roll axis 193 of a bus 100 prior to activation of a roll-dampening enabled suspension unit are shown during elapsed time period 625. At 630 (time ti), a driver or other operator of a bus 100, or any controller(s) 300, 302, 184, etc., can initiate a roll-suppression mode, in which some or all of controller(s) 300, 302, 184 directly or indirectly sense roll accelerations, for example by sensing that a state of extension of one or more units 18 has changed suddenly, based on signals generated by sensor(s) 182, etc.) and/or by height sensor(s) 182, and use valve(s) 183 on either or both sides of one or more axles 122 to cause pressure in one or more extensible units 18 to increase or decrease, thereby stiffening one or more strut(s) 181 when accelerations are increasing, and to wholly or partially deflate such strut(s) when accelerations decline, with the result that, as shown at 627, roll accelerations 621, 622 can be significantly decreased (by a magnitude of about 4× for accelerations 621, in the example shown).

This process can be understood by comparing strut valve positions (open/closed, and magnitude of opening) at 623 and strut extensions 621 with roll accelerations 622 during the time periods 625, 627. For example, as a bus is driving down a street or highway, height sensors 182 and/or accelerometers 187 can continuously generate signals representing the extent of extension or contraction of all or some extensible suspension unit(s) 18 on the bus; the rate of change of such extension or contraction; the pitch and/or roll accelerations experienced by the body 103 of the bus; and can route them to one or more controllers 300, 302, etc., and controller(s) 300, 302, etc., can generate, in response, command signals configured to cause one or more extensible units 18 to stiffen, soften, extend, or contract, in such way(s) as to counteract unwanted accelerations or movements of the body 103.

For example, as a bus 100 rounds a corner, centrifugal acceleration can cause its body 103 to roll or tilt away from the center of the turning radius, and thereby tend to cause one or more extensible suspension units 18 on the side of the bus opposite the center of turning radius to contract. On receipt of signals generated by height detectors 182 associated contractions or extensions of suspension units 18 with any or all of the wheels 16 affected by the rolling motion, and/or accelerometers 187 due to the rolling motion, controller(s) 300, 302 can counteract the roll by rapidly generating signals configured to cause any contracting suspension units to extend, and/or any extending units to contract.

In various embodiments of the invention, such roll-suppression techniques can be implemented in a variety of ways. For example, as a first step, in a 'passive state', extension/contraction of suspension unit(s) 18 can be segregated through the use of controllers 183, 184, 300 adapted to control one or more suspension units 18 independently of all others. For example, by blocking all fluid communication between suspension components 189 and their associated fluid controllers 183, and thereby 'decoupling' suspension units 18, on opposite ends of a single axle, rolling motions induced by those suspension units can be reduced or eliminated.

In an 'active' state, one, plural, or all extensible suspension units 18 can be independently controlled so as to counteract any undesired motions. For example, in a vehicle having two or more axles, extensible extension units 18 on each end of a first axle can be maintained at a desired static or varying level of stiffness, to provide general ride comfort, while height detectors 189 associated with each of the suspension units on such first axle can be monitored by a controller 300. As heights or relative levels of extension/contraction of the suspension units on each end of the axle fluctuate while the vehicle is in motion, the controller 300 can determine their average value and use such average value to either extend or contract each of the suspension units 18 on either end of one or more other axles. Enforcement of such average extension values on one or more units 18 of a second, third, and/or other further axle, based on activity of the first axle, can provide an advantageous combination of shock-reduction and stiffness, as observed in the passenger housing, resulting in improved ride quality for embarked passengers.

As an example of such a 'second axle-averaging' scheme, with reference to FIG. 3, at time $T_1$ a controller 300 can receive from one or both height sensors 182 associated with suspension units 18 on a first axle 122, 1004 signals indicating the following state of extension/contraction, relative to an at-rest condition for the units:

| OBSERVED FIRST AXLE STATE at time $T_1$ | | |
|---|---|---|
| TIME | LEFT UNIT STATE | RIGHT UNIT STATE |
| $T_1$ | Extended to +2.5 inches | Extended to +1.0 inches |

In other words, at time $T_1$ both suspension units are in an extended state. The height detector 182 associated with the left-hand unit has generated, and routed to the controller 300, signals indicating that the left-hand unit is extended 2.5 inches above its 'rest' position. The height detector 182 associated with the right-hand unit has generated, and routed to the controller 300, signals indicating that the right-hand unit is extended 1.0 inches above its 'rest' position.

On receipt of such signals, controller 300 can add the two state values together and divide by two, thereby determining that suspension units 18 on the first axle 122, 1004 are extended to an average of 1.75 inches. The controller 300 can then generate signals configured to enforce an extension of 1.75 inches on each of the suspension units at either end of at least one second axle 122, 1003, by for example causing the controllers 183, 184 to inflate air bag 181, 189 with such suspension units, using air from a reservoir 196, until suitable indications are received from height sensors 182 associated with units 18 on such second (or third or $N^{th}$ axle). Thus at time T1 the controller can route to the controllers 183, 184 associated with the at least one second axle signals configured to enforce the following condition on the at least one second axle:

| ENFORCED SECOND AXLE STATE at time $T_{1a}$ | | |
|---|---|---|
| TIME | LEFT UNIT STATE | RIGHT UNIT STATE |
| $T_{1a}$ | Extend to +1.75 inches | Extend to +1.75 inches |

At a subsequent observation, at time $T_2$, the controller 300 can receive from one or both height sensors 182 associated with suspension units 18 on the first axle 122, 1004 signals indicating the following state of extension/contraction, relative to an at-rest condition for the units:

| OBSERVED SECOND AXLE STATE | | |
|---|---|---|
| TIME | LEFT UNIT STATE | RIGHT UNIT STATE |
| $T_2$ | Contracted to −1.5 In. | Extended to +2.5 inches |

In other words, at time $T_2$ the left-hand unit is contracted to 1.5 inches lower than its nominal at-rest state, while the right-hand unit is now extended to 2.4 inches above its nominal rest state. The height detector 182 associated with the left-hand unit has generated, and routed to the controller 300, signals indicating that the left-hand unit is extended 1.5 inches lower its 'rest' position. The height detector 182 associated with the right-hand unit has generated, and routed to the controller 300, signals indicating that the right-hand unit is extended 2.4 inches above its 'rest' position.

On receipt of such signals, controller 300 adds the two values together and divides by two, thereby determining that suspension units 18 on the first axle 122, 1004 are extended to an average of 0.45 inches. The controller 300 then generates signals configured to enforce an extension of 0.45 inches on each of the suspension units at either end of at least one second axle 122, 1003. Thus at time $T_1$ the controller routes to the controllers 183, 184 associated with the at least one second axle signals configured to enforce the following condition on the at least one second axle by, for example, reducing the inflation of the two air bags 181, 189 associated with the axle 122, 1003:

| ENFORCED SECOND AXLE STATE | | |
|---|---|---|
| TIME | LEFT UNIT STATE | RIGHT UNIT STATE |
| $T_{2a}$ | Extend to +0.45 inches | Extend to +0.45 inches |

The process of reading extension/contraction states at each end of a first axle, averaging the state of the suspension units associated with the first axle, and enforcing the average values on multiple suspension units on one or more other axles can continue for so long as ride-control processes are in effect: for example, while the bus 100 is in motion, or while it is motion above a predetermined speed, etc., or until the suspension units 18 are all within a redetermined relative or absolute extension/contraction threshold state—for example, when none of the suspension units 18 is extended or contracted by more than 0.5 inches, or when the units are all extended or contracted to within 0.5 inches of each other. At such a point the controller 300 can return the system 1000 to a passive state such as that described above.

Moreover, rates at which extension states are sampled and responsive averaging instructions generated and/or are enforced can be varied in accordance with the configuration of the bus 100 and the objectives of its operators. Identifying suitable rates for sampling and responsive control action will not trouble those skilled in the relevant arts, once they have been made familiar with this disclosure.

Examples of criteria that can be enforced by controller(s) 300 in active ride-improvement or roll-suppression modes include:
    The controller can attempt to drive all suspension units to desired states of extension/contraction/stiffness at all desired times, based on any or all of vehicle speed, pitch and/or roll accelerations experienced by the body housing, geographic location or known road condition(s) (e.g., as determined by means of GPS) and/or available pneumatic/hydraulic pressure Active control mode(s) can be initiated under any desired condition(s), based on any or all of vehicle speed, pitch and/or roll accelerations experienced by the body housing, geographic location or known road condition(s) (e.g, as determined by means of GPS) and/or available pneumatic/hydraulic pressure For example, a passive state can be in force at speeds below 10, 15, 25 or 20 miles an hour, or other specified speeds. As a further example, an active state can be initiated when, and persist for so long as, an extension/contraction state of any one or more units exceeds a threshold value (e.g., 1 inch or 0.5 inch) for more than a predetermined amount of time (e.g., 0.25 second, 0.5 second, or 1.0 second); and/or when an accelerometer reading exceeds a predetermined value (e.g., lateral acceleration of more than 0.2 g or roll of more than 5 degrees per second about any axis) for more than a threshold period of time. When any such conditions cease to exist, control can be returned to the passive state.

Alternatively, or in addition, multiple active states can be enforced based on increasing vehicle speeds. For example, the following states can be enforced:

RIDE CONTROL STATES

| SPEED | STATE | EXTENSION THRESHOLD(S) | RESPONSE TIME(S) |
|---|---|---|---|
| <10 MPH | PASSIVE | NA: nominal stiffness | N/A: nominal resp. |
| 10-15 MPH | $1^{st}$ ACTIVE | >0.25 in. | <0.5 sec. |
| 15-25 MPH | $2^{nd}$ ACTIVE | >0.10 in. | <0.1 sec. |
| >25 MPH | $3^{rd}$ ACTIVE | >0.05 in. | <0.05 sec. |

In other words, at speeds below 10 mph controller(s) 300, 183, 184, etc., enforce the passive state described above, in which suspension units 18 are isolated from each other and allowed to respond normally.

At speeds above 10 mph, the controller(s) 300, 183, 184, etc. enforce progressive active roll suppression measures. As speed increases, the thresholds for suspension/contraction by suspension units 18 which trigger processes for enforcing on at least one second axle extensions and/or contractions equal to the average state on a first axle can be progressively reduced. Thus for example a change of at least ¼ inch(es) in the extension of any suspension unit can be required to trigger an averaging response at 7 MPH, while a deflection of no more than ¹⁄₂₀ inch can suffice at 30 MPH.

In some embodiments, strut control systems like those shown in FIG. 3 are used in conjunction with air management strategies, in order to minimize air usage and therefore increase the efficiency of energy use on board the bus 100.

As previously noted, such roll suppression features can be integrated with access ramp features disclosed herein.

Thus it will be understood that in various aspects and embodiments the invention(s) disclosed herein provide passenger buses 100 comprising controllers 300, 302, 184, etc., comprising or otherwise communicatively linked with one or more suspension height sensor 182 associated with each of a plurality of controllably extensible suspension units 18 associated each of a plurality of wheels 16 disposed on at least two axles 122, and the controller(s) 300. 302, 184 are configured, while the vehicle(s) 100 are in motion, to determine the state of extension of each of the suspension units 182 disposed on a first axle 122, determine an average of the determined extension states, and extend or contract each of the suspension units 18 disposed on at least a second axle 122 in order to place each of the suspension units disposed on the at least second axle in the average extension state determined by the controller, in order to dampen a rolling motion.

It will further be understood that, in various aspects and embodiments, the invention provides roll suppression systems for passenger buses 100 having passenger compartments in bodies 104 and associated longitudinal and transverse axes 193, 191, respectively, at least two axles 122, each of the at least two axles supported by one or more controllably extensible suspension units 18; one or more body roll sensors adapted to generate signals representing or otherwise associated with rotational accelerations of the passenger compartment about one or more of the longitudinal and transverse axes; one or more suspension controllers 183, 184 communicatively linked to the one or more controllably extensible suspension units 18 and the one or more roll sensors; wherein the suspension controller(s) 183, 184 are configured to vary a stiffness of at least one of the controllably extensible curbside suspension units 18 in response to receipt of signals generated by the one or more roll sensors, and thereby to dampen roll of the passenger compartment about one or more of the longitudinal and transverse axes.

In various aspects and embodiments the invention enables further improvements in efficiency, reliability, and safety by enabling controllers 300, 302, 184, etc., to automatically control ramp/and or suspension operations based on sensed geographic position (sometimes known as geo-fencing operations). For example, a controller 300 of a bus 100 in accordance with such aspects and embodiments can comprise, or otherwise be communicatively linked to, any one or more of GPS device(s) 211, RFID, and/or other devices 733 for sensing vehicle geographic location or proximity to structures, etc., in order to automatically identify ramp deployment and/or suspension extension/contraction conditions to be implemented at a passenger stop, terminal, or maintenance facility, etc., or to accommodate temporary conditions due to road or wayside construction, accidents, or other incidents, etc. For example, a ramp 200 of a bus 100 stopped at a passenger stop associated with a known curb height can be automatically deployed to the proper height.

An embodiment of a bus 100 configured for such automatic ramp deployment and/or suspension operations is shown in FIG. 1B. In the embodiment shown, a bus 100 has approached a passenger stop, terminal, or other passenger loading point 700 having a having a passenger loading surface 709, such as a curb, sidewalk, or platform, which is located at a height 712 above a road, driveway, or other surface 711 on which the bus 100 is stopped. The loading point 700 is provided with radio-frequency identification (RFID), low-powered radio, or other local communication device(s) 733a capable of communicating information such as vehicle stop identification, desired ramp deployment heights, etc., to a corresponding device 733b on the bus 100. Alternatively or in addition, the bus 100 is equipped with a GPS or other mobile geographic location system 211 (FIG. 2A), configured to provide location and optionally bus orientation (e.g., heading) information to a controller 300, for cross-referencing by the controller 300 with a look-up table comprising ramp deployment and/or suspension operation requirements for referred or required modes of displacement for proper juxtaposition of the bus 100 and ramp 200 with respect to the loading point 700. The bus 100 is otherwise equipped as described herein.

An example of automated ramp and suspension deployment through the use of geo-fencing techniques using local communication devices includes a bus 100 approaching a ramp or other loading point 700. As the bus is approaching, or when the bus is otherwise in a suitable position with respect to the loading point 700, a local communication device 733 can communicate to a controller 300 of the bus, using radio wave, optical, sonic, or other communications means, information sufficient to enable the controller 300 to cause a ramp 700 to deploy to a desired height and/or condition (e.g., minimal ramp slope, constant ramp slope, etc., as described herein) without manual input from a driver or other operator of the bus. For example, on approach or after stopping, the local communication device(s) 733 and controller 300 of the bus can cooperate to ensure that ramp height module of the controller 300 has access to data representing at least the curb, platform, or other passenger surface height 712, so that the controller can then, using any or all of passenger door sill height 724, required or otherwise-preferred ramp angle 711 (ramp slope with respect to the horizon or gravity), and/or other control conditions, instruct some or all of ramp controllers 206, 217 and/or suspension unit(s) 18 to deploy the ramp 200 and optionally contract door-side suspension unit(s) 18, 771 and/or extend opposite side suspension unit(s) 18, 772 as shown to place the passenger ramp 200 in a desired configuration.

In such embodiments, passenger surface height 712 and any other local information associated with the loading point 700 can be communicated by local communication device(s) 733a and/or can be stored in other local or remote memory accessible by the controller(s) 300 for retrieval by the controllers 300, using a ramp height module such as a suitably-configured software routine or application, based on location or other identification information provided by the loading point system 733. For example, a device 733a can communicate to the bus 100 a stop ID associated with structure 700 or surface 709, upon which controller(s) 300 can look up desired or required ramp and/or suspension deployment parameters in a table stored in memory on the bus, or remotely, for use in generating suitable commands for controlling devices 200, 18, etc.

In embodiments in which a bus 100 and/or controller 300 is provided with a GPS 217 or other mobile geographic positioning device 211, 219, 221, 228 etc., the controller 300 can, when in a desired position or distance 810 from a load point 700, 709, commence such processes using curb height 712 and other data stored locally on the bus 100 or remotely, and accessible by the controller 300 using wireless communications devices. Such data can be stored in tabular form, for example in the form of data sets associating loading point characteristics such as passenger surface heights 712 with specific locations associated with specific locations on digital maps, etc. In other words, for example, a desired vertical offset or other system configuration parameter can be determined at least partly by comparison of a signal representing a location of the bus to data representing digital map information. Alternatively such configuration parameters can be provided in the form of digital look-up tables provided by transit operators, etc.

In further embodiments, passenger surface height 712 can be determined through the use of curb height detectors or other sensors 224 such as optical and/or mechanical sensors 223, 335, 227, such as an array of lasers or laser scanning device(s) 767, 223 and/or mechanical or optical curb feelers 768. Laser scanning devices 767 can use arrays comprising multiple lasers and/or controlled steering of laser beams with laser rangefinders, using known means.

In such instances device(s) 767, 768 can provide heights 712 directly to controller(s) 300 for processing in determining preferred operations and sequences to be used in activating ramp controller(s).

In addition to use of geo-fencing and other location-based automatic configuration of suspension and/or ramp systems to enable onloading or offloading of passengers and others from buses, the same types of devices can be used to cause buses to be raised above or dropped below normal ride height in order to clear door structures, rocks or other obstacles in roads or other driveways, etc. For example, a bus approaching a maintenance barn or other structure 700 can be caused to 'sit down' by contracting all four (or more) extensible suspension units 18 to a state of full or partial contraction in order to clear an overhead door or door structure of a height 738; likewise a plurality of unit(s) can be used to raise a bus 100 or part of a bus in order clear a known road or driveway obstacle.

Thus the invention provides, in various aspects and embodiments, passenger buses comprising one or more deployable passenger access ramps 200 configured to selectably provide a substantially continuous passenger path from a surface outside a body 103 of the bus to a passenger door sill 123, and one or more controllers 300 adapted to control selectable deployment and retraction of the at least one passenger ramp 200, the controller 300 comprising a ramp height module, which may comprise any or all of hardware, software, or firmware configured to generate signals usable by the controller 300 in determining a desired vertical offset 713 between the sill of the passenger door and a distal edge of the at least one deployable passenger support panel ramp when the ramp is in a deployed configuration. In such embodiments the desired vertical offset can be determined in a wide variety of ways, including at least partly by comparison of a signal representing a location of the bus to data representing a location on a digital map, and/or through the use of signals generated by a curb height sensor 767, 768.

The invention further provides such buses wherein controllers 300 can be adapted to control selectable deployment and retraction of the at least one passenger ramp 200, and/or to control extension of each of a plurality of controllably extensible suspension units 18; wherein the controller(s) 300 are configured to received signals representing a location of the bus and, based at least partly on the represented location, selectively cause at least one of the following location-based actions:
  deployment of the passenger access ramp 300 to a deployed position;
  retraction of the passenger access ramp to a stowed position;
  extension of one or more of the controllably extensible suspension units 18; and
  contraction of one or more of the controllable extensible suspension units 18;
wherein any or all of the selectively-caused location-based actions can be selected based at least partly by comparison of a signal representing a location of the bus to data representing a digital map, and/or at least partly on signals representing proximity of the bus 100 to one or more objects.

It will further be seen that, in various aspects and embodiments, the invention(s) disclosed herein provide, among other improvements, passenger buses 100 having bodies 103 supported by frames 140 and housing pluralities of passenger seats 142 in a body housing 102; one or more passenger doors 120 configured to enable passenger access through one or more sides 104 of the body housing; at least one deployable passenger access ramp 200 configured to selectably provide a substantially continuous passenger path from a surface 709, 711 outside the body to at least one of the passenger doors 120, such deployable passenger access ramps comprising at least one deployable passenger support panel 14, 10, 26 and, when deployed, a distal ramp edge 202. In such buses the frame 140 can be supported by a plurality of wheels 16 on the side of the frame comprising the passenger door and a plurality of wheels 16 on a side of the frame opposite the passenger door, each of the wheels supported by controllably extensible suspension units 18. Such a bus can further comprise one or more controllers 300, 302, 184, etc., configured, during a ramp deployment process when the bus 100 is stationary, to controllably extend or contract one or more of the controllably extensible suspension units 18 in order to control a grade of the at least one deployable passenger support panel 14, 10, 26; and while the bus is in motion, extend or contract at least one of the controllably extensible suspension units in order to dampen a rolling motion of a passenger compartment in the body 104 of the bus about at least one of a longitudinal axis 193 and a transverse axis 191 of the passenger compartment or the body 104.

It may further be seen from the foregoing that the invention(s) disclosed herein provide such buses 100, wherein the access ramp 200 comprises a plurality of passenger support panels 10, 14, 26, and the controller(s) 300, 350, 184 are configured to deploy the access ramp 200 and selectably extend the suspension units 18, either by extending them or contracting them, or both; such that upon completion of deployment the plurality of passenger support panels 10, 14, 26 are deployed to a constant grade.

Alternatively, or in addition, in various embodiments the invention(s) disclosed herein provide passenger buses according to any of the foregoing, wherein the controller(s) 300, 302, 184 are configured to deploy the access ramp(s) 200 to a maximum rise limit prior and then selectably contract the curbside suspension units 18, 771 until the distal edge of the deployed ramp is in contact with a surface outside the body of the bus. Alternatively, or in addition, when the controller(s) 300, 302, 184 etc., can further be configured to deploy the access ramp to a maximum rise limit prior and then selectably extend the suspension units 18, 772 on the side of the frame opposite the passenger door until the distal edge 202 of the deployed ramp is in contact with a surface 709, 711 outside the body of the bus.

It will further be seen that in various aspects and embodiments the invention(s) disclosed herein provide passenger buses according to any of the foregoing, wherein the passenger door 120 comprises a sill 125 and the controller(s) 300, 302, 184 comprises a ramp height module configured to generate signals usable by the controller(s) in determining a desired vertical offset 724 between the sill 125 of the passenger door 120 and a distal edge 202 of the at least one deployable passenger support panel ramp 10, 14, 26 when the ramp 200 is in a deployed configuration, and in deploying the ramp 200 to establish such vertical offset.

According to the same and further aspects of the invention, the disclosure provides passenger buses 100, such a bus comprising a frame 140 supported by at least three wheels 16, at least two of the wheels 16 supported by controllably extensible suspension units 18; a body 103 supported by the frame 140 and housing a plurality of passenger seats 142; one or more passenger doors 120 configured to enable access to the body housing 103; at least one deployable passenger access ramp 200 configured to selectably provide a substantially continuous passenger path from a surface 709 outside the body to the passenger door 120, the deployable access ramp 200 comprising at least one deployable passenger support panel 10 and, when deployed, a distal ramp edge 202; the controllably extensible curbside suspension units 18 adapted to contract in conjunction with deployment of the access ramp 200, whereby a grade 711 of at the least one passenger support panel 10 can be controllably reduced when the distal edge 202 of the deployed ramp is in contact with the surface 709 outside the body 103 of the bus.

Such a bus 100 can comprise one or more controllers 300 configured to control selective contraction or extension of the suspension units 18, in response to command signal(s) generated by an operator of the bus, in conjunction with deployment of the access ramp 200 and separately from deployment of the access ramp 200, to controllably reduce the grade 711 of the at least one passenger support panel 10. Optionally, such controller(s) 300 can be configured for automatic contraction or extension of the suspension units 18 in conjunction with deployment of the access ramp(s).

Such controllers 300 can be configured to automatically control deployment of an access ramp 200 having multiple panels 10, 14, 26 such that upon completion of deployment the plurality of passenger support panels are deployed to a constant grade, regardless of deployed ramp rise or contraction of the suspension units. In these and other embodiments of the invention, the controller 300 can be communicatively linked to, or otherwise comprise, one or more such as ammeters sensors and thereby configured to sense contact of the distal edge of the at least one ramp panel with the surface outside the body of the bus, and upon sensing that the surface has been contacted by the distal edge, e.g, by a rise in current draw by a motor driving the ramp 200 to initiate contraction of the suspension unit.

It will further be seen that the invention provides passenger buses 100 comprising passenger compartments in bodies 103 supported by at least two axles 122, each of the at least two axles supported by one or more controllably extensible suspension units 18; one or more body roll sensors 182, 187, etc., adapted to generate signals associated with rotational accelerations of the passenger compartment about at least one of a longitudinal axis 193 and a transverse axis 191 of the passenger compartment; and a suspension controller 300 controllably linked to the one or more controllably extensible suspension units 18 and the one or more roll sensors 182, 187, etc., the suspension controller 300 configured to vary a stiffness of at least one of the controllably extensible curbside suspension units 18 in response to receipt of signals generated by the one or more roll sensors, and thereby to dampen roll of the passenger compartment about one or more of the longitudinal and transverse axes. For example, in some embodiments such roll sensors comprise extension sensors 182 associated with each of one or more controllably extensible suspension units 18, each of the extension sensors 182 adapted to generate signals representing the extent to which the controllably extensible suspension unit is extended or contracted; wherein a suspension controller 300, 183, 184 is controllably linked to the each of the controllably extensible suspension units 18 and configured to receive signals generated by each of the extension sensors 182 and the suspension controller(s) are configured to determine, based at least partly on signals generated by the extension sensors, that at least two suspension units disposed on a common side of the bus have contracted, and in response to said determination route to at least two suspension units on an opposite side of the bus signals configured to cause the at least two suspension units on an opposite side of the bus to extend, and thereby dampen a rolling motion of the bus.

In the same and other embodiments, the invention provides buses having passenger compartments 103 supported by at least two axles 122, each axle having two ends, each end of each axle supported at by at least one controllably extensible suspension unit 18, and each extensible suspension unit 18 comprising an extension sensor 182 adapted to generate signals representing the extent to which the controllably extensible suspension unit is extended or contracted. The buses further comprise suspension controller(s) 300, 302, 183, 184 controllably linked to the each of the controllably extensible suspension units 18 and configured to receive signals generated by each of the extension sensors 182; the suspension controllers 300, 302, 183, 184 configured to determine, based at least partly on signals generated by extension sensors 182 of suspension units at each end of a first one of the at least two axles 122, the average extension of the suspension units at each end of said first axle, and to route to at least one suspension unit supporting each end of at least a second of the at least two axles signals configured to cause the at least one suspension unit supporting each end of the at least second axle to extend to the determined average extension of the suspension units on the first axle.

In further aspects and embodiments, the invention provides controllers 300 adapted for the operation and control of any of the systems, buses, and/or processes disclosed, suggested, or otherwise described herein.

In further aspects and embodiments, the invention provides computer program products, and persistent machine-readable media storing such products, adapted for the operation and control of any of the systems, buses, and/or processes disclosed, suggested, or otherwise described herein.

In further aspects and embodiments, the invention provides combinations of any and all systems, buses, and controllers disclosed, suggested, or otherwise described herein.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

Selected features from one or more of the above-described embodiments may be combined to create alternative embodiments not explicitly delimited, features suitable for such combinations being readily apparent to persons skilled in the art. The subject matter described herein in the recited claims intends to cover and embrace all corresponding changes in technology.

What is claimed is:

1. A control module for a passenger bus, the passenger bus comprising:
    a body supported by a frame and housing a plurality of passenger seats; at least one passenger access door configured to enable passenger access through at least one side of the body; and
    a plurality of vehicle exterior condition sensors, the plurality of vehicle exterior condition sensors comprising:
        at least one passenger presence detector;
        at least one vehicle navigation sensor;
        at least one steering controller;
        at least one speed controller;
        at least one extensible suspension controller; and
        at least one passenger access door controller;
    wherein the control module comprises at least one controller configured to:
        receive from the at least one vehicle navigation sensor signals indicating at least a position and orientation of the passenger bus, and a speed at which the passenger bus is moving;
        receive from the at least one passenger presence detector signals indicating the presence of a passenger;
        generate, based at least on the signals indicating a position, orientation, and speed of the passenger bus, signals adapted for causing some or all of the steering controller and the speed controller to navigate the passenger bus to a desired location relative to a passenger loading facility and place the passenger bus in a stopped passenger loading condition;
        route the signals for navigating the passenger bus to some or all of the speed controller and the steering controller; and
        when the bus is in a stopped passenger loading condition, route to the at least one passenger access door controller signals adapted to cause the passenger access door controller to open the passenger access door.

2. The control module of claim 1, wherein the control module comprises at least one controller configured to:
    generate, based at least on the same or other signals indicating a position and orientation of the passenger bus relative to a passenger loading facility, signals adapted to cause the at least one extensible suspension controller to expand or contract in order to place at least a portion of the passenger access door in a desired juxtaposition to the passenger loading facility.

3. A control module for a passenger bus, the passenger bus comprising a body supported by a frame and housing a plurality of passenger seats; at least one passenger access door configured to enable passenger access through at least one side of the body; and at least one vehicle exterior condition sensor;
    the control module comprising at least one controller configured to:
        receive from the at least one vehicle exterior condition sensor signals representing at least one vehicle exterior condition;
        based at least partly on the at least one vehicle exterior condition, generate signals adapted to cause at least partially automatic operation of at least one passenger embarkation component of the passenger bus; and
        route the generated signals to the at least one passenger embarkation component.

4. The control module of claim 3, wherein:
    the at least one passenger embarkation component comprises the at least one passenger access door;
    the at least one vehicle exterior condition sensor comprises at least one passenger presence detection device;
    the at least one vehicle exterior condition comprises the presence at passenger embarkation location of at least one bus passenger; and the generated signals comprise at least one passenger access door actuation command.

5. The control module of claim 4, wherein
the passenger bus comprises at least one speed controller and at least one steering controller;
the at least one vehicle exterior condition sensor comprises at least one vehicle orientation sensor; and
the controller is configured to:
receive from the at least one speed controller signals indicating a speed at which the passenger bus is moving;
receive from the at least one vehicle orientation sensor at least one of a location of the passenger and an orientation of the passenger bus relative to a passenger loading facility;
based at least partly on the signals received from the at least one speed controller and the at least one vehicle orientation sensor, generate signals adapted to cause the steering controller and the speed controller to at least partially automatically navigate the passenger bus to a stop at a predetermined location and orientation with respect to the passenger loading facility; and
route the generated signals to the at least one speed controller and the at least one steering controller.

6. The control module of claim 4, wherein the at least one passenger presence detection device comprises a geo-fencing component.

7. The control module of claim 4, wherein the at least one passenger presence detection device comprises a thermal imager.

8. The control module of claim 4, wherein the at least one passenger presence detection device comprises a light detection and ranging (LIDAR) device.

9. The control module of claim 4, wherein the at least one passenger presence detection device comprises a camera.

10. The control module of claim 4, wherein the at least one passenger presence detection device comprises a receiver configured to receive from an off-board passenger presence annunciator signals representing a declaration of the presence of at least one passenger.

11. The control module of claim 3, wherein:
the at least one passenger embarkation component comprises at least one exterior passenger access light;
the at least one vehicle exterior condition sensor comprises at least one exterior light condition sensor;
the at least one vehicle exterior condition comprises a low light level; and
the generated signals comprise at least one exterior passenger access light actuation command.

12. The control module of claim 3, wherein:
the at least one passenger embarkation component comprises at least one annunciator;
the at least one vehicle exterior condition sensor comprises at least one passenger presence detection device;
the at least one vehicle exterior condition comprises the presence at passenger embarkation location of at least one bus passenger; and
the generated signals comprise at least one passenger access announcement instruction.

13. The control module of claim 12, wherein:
the at least one passenger embarkation component comprises at least one deployable passenger access ramp; and
the generated signals comprise signals adapted to cause at least partially automatic deployment of the passenger access ramp.

14. The control module of claim 12, wherein:
the at least one passenger embarkation component comprises at least one extensible suspension controller; and
the generated signals comprise signals adapted to cause at extensible suspension controller to at least partially automatically extend or contract at least one extensible suspension unit associated with an axle of the passenger bus.

15. The control module of claim 3, wherein:
the at least one vehicle exterior condition sensor comprises at least one device configured to provide to the control module signals representing a determined location of the passenger bus; and
based at least partly on the determined location of the passenger bus, the control module is configured to generate at least one passenger access door actuation command.

16. The control module of claim 15, wherein the determined location of the passenger bus comprises at least a location of the passenger bus relative to a passenger embarkation facility.

17. The control module of claim 15, wherein the determined location of the passenger bus comprises at least an orientation of the passenger bus relative to a passenger embarkation facility.

18. The control module of claim 15, wherein
the at least one passenger embarkation component comprises a plurality of passenger access doors; and
based at least partly on the determined location of the passenger bus, the control module is configured to generate at least one passenger access door actuation command configured to actuate less than all of the plurality of passenger doors.

19. The control module of claim 15, wherein:
the at least one passenger embarkation component comprises at least one annunciator;
the at least one vehicle exterior condition sensor comprises at least one passenger presence detection device;
the at least one vehicle exterior condition comprises the presence at passenger embarkation location of at least one bus passenger; and
the generated signals comprise at least one passenger access announcement instruction.

20. The control module of claim 15, wherein:
the at least one passenger embarkation component comprises at least one deployable passenger access ramp; and
the generated signals comprise signals adapted to cause at least partially automatic deployment of the passenger access ramp.

21. The control module of claim 15, wherein:
the at least one passenger embarkation component comprises at least one extensible suspension controller; and
the generated signals comprise signals adapted to cause at extensible suspension controller to at least partially automatically extend or contract at least one extensible suspension unit associated with an axle of the passenger bus.

22. The control module of claim 15, wherein:
the at least one vehicle exterior condition sensor comprises at least one device configured to provide to the control module signals representing a determined location of the passenger bus;
the at least one vehicle exterior condition comprises at least a location of the passenger bus;
the at least one passenger embarkation component comprises an extensible vehicle suspension system; and based at least partly on the location of the passenger bus, the generated signals comprise at least one signal configured to cause extension or contraction of components of the extensible vehicle suspension system associated with at least one wheel of the passenger bus.

23. The control module of claim 15, wherein:
the at least one vehicle exterior condition sensor comprises at least one device configured to provide to the control module signals representing a determined location of the passenger bus;
the at least one vehicle exterior condition comprises at least a location of the passenger bus;
the at least one passenger embarkation component comprises a deployable passenger access ramp; and
based at least partly on the location of the passenger bus, the generated signals comprise at least one signal configured to cause deployment of the deployable access ramp.

24. The control module of claim 15, wherein:
the at least one vehicle exterior condition sensor comprises at least one device configured to provide to the control module signals indicating that a deployable passenger access ramp has encountered an obstruction;
the at least one vehicle exterior condition comprises at least an obstruction of one or more portions of a deployable passenger access ramp;
the at least one passenger embarkation component comprises the deployable passenger access ramp; and
based at least partly on receipt of the signal indicating that the deployable passenger access ramp has encountered an obstruction, the generated signals comprise at least one signal configured to suspend deployment of the deployable access ramp.

25. A control module for a passenger bus, the passenger bus comprising a body supported by a frame having at least one axle and housing a plurality of passenger seats; at least one passenger access door configured to enable passenger access through at least one side of the body; and at least one vehicle orientation sensor;
the control module comprising at least one controller configured to:
receive from the at least one vehicle orientation sensor signals representing at least one vehicle orientation condition;
based at least partly on the at least one vehicle orientation condition, generate signals adapted to cause at least partially automatic operation of at least one component of an extensible suspension system associated with at least one end of the at least one axle; and
route the generated signals to the at least one component of the extensible suspension system.

26. The control module of claim 25, wherein:
the passenger bus comprises:
an energy storage system comprising at least one re-chargeable battery; and
at least one overhead charging unit configured to engage an external overhead charging system in order to re-charge the at least one re-chargeable battery; and
the at least one vehicle orientation sensor comprises
at least one device configured to provide to the control module signals representing a determined location of the passenger bus; and
at least one device configured to provide to the control module signals representing a level status of at least one axle of the passenger bus;
and wherein the control module is configured to, based at least partly on the determined location of the passenger bus and the level status of the at least one axle of the passenger bus, generate signals adapted to cause at least partially automatic operation of at least one component of an extensible suspension system associated with at least one end of the at least one axle.

27. The control module of claim 26, wherein
the at least one overhead charging unit configured to engage an external overhead charging system is at least partially automatically deployable, and
the control module is configured to, based at least partly on the determined location of the passenger bus and the level status of the at least one axle of the passenger bus, generate signals adapted to cause at least partially automatic deployment of the overhead charging unit.

28. The control module of claim 25, wherein;
the control module comprising at least one controller configured to:
receive from the at least one vehicle orientation sensor signals representing at least one vehicle orientation condition relative to a passenger loading facility;
based at least partly on the at least one vehicle orientation condition, generate signals adapted to cause at least partially automatic operation of at least one component of an extensible suspension system associated with at least one end of the at least one axle in order to minimize a gap between a least a portion of the passenger door and the passenger loading facility; and
route the generated signals to the at least one component of the extensible suspension system.

* * * * *